(12) United States Patent
Karapantelakis et al.

(10) Patent No.: US 11,963,047 B2
(45) Date of Patent: Apr. 16, 2024

(54) LINK CHANGE DECISION-MAKING USING REINFORCEMENT LEARNING BASED ON TRACKED REWARDS AND OUTCOMES IN A WIRELESS COMMUNICATION SYSTEM

(71) Applicant: Telefonaktiebolaget LM Ericsson (publ), Stockholm (SE)

(72) Inventors: Athanasios Karapantelakis, Solna (SE); Elena Fersman, Stockholm (SE); Rafia Inam, Västerås (SE); Markus Andersson, Boden (SE); David Lindero, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 305 days.

(21) Appl. No.: 17/286,065

(22) PCT Filed: Oct. 18, 2018

(86) PCT No.: PCT/EP2018/078509
§ 371 (c)(1),
(2) Date: Apr. 16, 2021

(87) PCT Pub. No.: WO2020/078552
PCT Pub. Date: Apr. 23, 2020

(65) Prior Publication Data
US 2021/0377822 A1 Dec. 2, 2021

(51) Int. Cl.
*H04W 36/00* (2009.01)
*G06N 20/00* (2019.01)
(Continued)

(52) U.S. Cl.
CPC ........ *H04W 36/0058* (2018.08); *G06N 20/00* (2019.01); *H04W 36/00837* (2018.08); *H04W 36/165* (2013.01); *H04W 36/30* (2013.01)

(58) Field of Classification Search
USPC .......................... 455/436–444; 370/331–333
See application file for complete search history.

(56) References Cited

U.S. PATENT DOCUMENTS 9,014,147 B1  4/2015  White et al.
9,622,133 B1  4/2017  Guvenc
(Continued)

FOREIGN PATENT DOCUMENTS

GB        2507079 A     4/2014

OTHER PUBLICATIONS

3GPP, "3GPP TS 23.009 V15.0.0", 3rd Generation Partnership Project; Technical Specification Group Core Network and Terminals; Handover procedures (Release 15), Jun. 2018, 1-299.
(Continued)

*Primary Examiner* — Suhail Khan
(74) *Attorney, Agent, or Firm* — Murphy, Bilak & Homiller, PLLC

(57) ABSTRACT

Decision-making equipment (22) is configured for link change decision-making using reinforcement learning. The decision-making equipment (22) is configured to track rewards (30-1, . . . 30-M) earned for, and outcomes (28-1, . . . 28-M) of, respective link change decisions (26-1, . . . 26-M). In some embodiments, possible outcomes of a link change decision to change a serving link of a wireless device to a target link include at least: a change of the serving link of the wireless device from the target link to another link; and a network-initiated disconnect of the wireless device from the target link. Regardless, the decision-making equipment (22) is also configured to make a link change decision (28-(M+1)) based on the tracked rewards (30-1, . . . 30-M) and outcomes (28-1, . . . 28-M).

24 Claims, 19 Drawing Sheets

(51) Int. Cl.
  *H04W 36/16* (2009.01)
  *H04W 36/30* (2009.01)

(56) References Cited

U.S. PATENT DOCUMENTS

| | | |
|---|---|---|
| 2013/0031036 A1 | 1/2013 | Kojima |
| 2013/0122885 A1 | 5/2013 | Kojima |
| 2015/0289181 A1* | 10/2015 | Bromell ............ H04W 36/0061 455/436 |

OTHER PUBLICATIONS

Author Unknown, "How LTE Stuff Works ?: LTE: Cell Range Extension (CRE)", howltestuffworks.blogspot.com/2016/02/cell-range-extension-cre.html, accessed Mar. 16, 2021, 1-6.

Bonneau, Maxime, "Reinforcement Learning for 5G handover", Master Thesis in Statistics and Data Mining, Linköping University, Department of Computer and Information Science, Division of Statistics, Linköping, Sweden, Jun. 2017, 1-69.

Mammen, Stephen "Making Sense of Signal Strength/Signal Quality Readings for Cellular Modems", Industrial Networking Solutions Tips and Tricks, blog.industrialnetworking.com/2014/04/making-sense-of-signal-strengthsignal.html, accessed Mar. 16, 2021, 1-3.

Simsek, Meryem, et al., "Context-Aware Mobility Management in HetNets: A Reinforcement Learning Approach", 2015 IEEE Wireless Communications and Networking Conference (WCNC), New Orleans, LA, May 2015, 1-7.

Sun, Yao, et al., "Reinforcement Learning based Handoff for Millimeter Wave Heterogeneous Cellular Networks", 2017 IEEE Global Communications Conference (GLOBECOM 2017), Singapore, 2017, 1-6.

Kiaohuan, Yan, et al., "A survey of vertical handover decision algorithms in Fourth Generation heterogeneous wireless networks", Computer Networks, vol. 54, Elsevier B.V., 2010, 1848-1863.

* cited by examiner

Retrieve all Decisions for a certain IMSI

Group Decisions into different Sets $S_k$ associated with different target links $Target_k$, where $k=1,...K$ For each Set $S_k$ containing $j=0,...J$ Decisions Compute cumulative reward $C_k = \sum_{j=0}^{J} \left( \frac{Reward_j \cdot Discount_j}{J} \right)$ where $Reward_j$ is the reward earned for $Decision_j$
where $Discount_j$ is the discount to apply to $Reward_j$ Return $Target_k$ for $\operatorname*{argmax}_{k} C_k$

FIG. 3

LINK CHANGE DECISION-MAKING USING REINFORCEMENT LEARNING BASED ON TRACKED REWARDS AND OUTCOMES IN A WIRELESS COMMUNICATION SYSTEM

TECHNICAL FIELD

The present application relates generally to a wireless communication system, and relates more particularly to link change decision-making in such a wireless communication system.

BACKGROUND

Handover in a wireless communication system is a process for transferring a wireless device with an ongoing call or data session from a source link to a target link (e.g., from a source cell to a target cell). Where multiple links are candidates for being the target link of the handover, a decision must be made as to which of the multiple candidate links should be the target of the handover. This decision has traditionally been made based on signal strength/quality measurements of the candidate links, transmitting frequency and power of the candidate links, available resources at the candidate links, or other such "snapshot" parameters that characterize which candidate link is most suitable as the handover target at a certain time instant.

Although focusing on instantaneous suitability enables efficient handover decision-making, this approach ultimately gambles device performance and system-wide efficiency on instantaneous suitability being an accurate predictor of which link proves best as the handover target over the long-term.

SUMMARY

Some embodiments herein perform link change decision-making using reinforcement learning. A link change decision in this regard is based on rewards earned for, and outcomes of, previous link change decisions. The outcome of a previous decision to change a wireless device to a target link notably characterizes how the decision ultimately turned out with respect to the target link. In some embodiments, for example, the outcome reflects how the wireless device eventually became detached or disconnected from the target link after the decision was made and carried out. Possible outcomes may thereby include the wireless device changing from the target link to yet another link, or the network initiating disconnect of the device from the target link (e.g., dropped call due to network fault such as overload). Correspondingly, the reward for a previous decision may in some embodiments characterize an extent to which the decision was "successful" (e.g., according to one or more metrics such as quality of service, QoS) up until the outcome of the decision occurred. The outcomes and rewards for link change decisions in this way provide insight into how good or bad those decisions ultimately ended up being over a relatively longer term than conventional instantaneous decision making. Exploiting reinforcement learning based on such outcomes and rewards of past decisions, a link-change decision maker advantageously learns over time which link change decisions ultimately prove more suitable or successful.

In fact, in some embodiments, a link-change decision maker alternatively or additionally performs device-specific reinforcement learning so as to learn on a device-by-device basis. A link change decision for a wireless device may therefore be based selectively on the rewards for and outcomes of link change decisions previously made for that specific device. These embodiments may thereby advantageously tailor link change decision-making to the unique nature of any given device, e.g., so as to account for the type or class of the device, how a certain device tends to move in space, or service demands imposed by the particular device. This allows some embodiments to make link change decisions that optimize or otherwise take into account the impact of those decisions on the specific device's performance or quality of service.

More particularly, embodiments herein include a method for link change decision-making using reinforcement learning. The method comprises tracking rewards earned for, and outcomes of, respective link change decisions. In some embodiments, possible outcomes of a link change decision to change a serving link of a wireless device to a target link include at least: a change of the serving link of the wireless device from the target link to another link; and a network-initiated disconnect of the wireless device from the target link. Regardless, the method may also include making a link change decision based on the tracked rewards and outcomes.

In some embodiments, making a link change decision based on the tracked rewards and outcomes comprises making a link change decision for a wireless device based selectively on the rewards and outcomes tracked for link change decisions previously made for that wireless device.

In some embodiments, making a link change decision comprises calculating, for each candidate target link that is a candidate for the link change decision to be made, a cumulative reward metric as a function of the rewards earned for past link change decisions that selected the candidate target link. Making the decision in this case may comprise making the link change decision as a function of the cumulative reward metrics calculated for the candidate target links. In one embodiment, for example, making the link change decision comprises selecting the candidate target link with the highest cumulative reward metric. In other embodiments, though, the method may further comprise obtaining, for each candidate target link, a measurement-based metric that is a function of a measurement on the candidate target link, and calculating, for each candidate target link, a combined metric as a weighted combination of the cumulative reward metric and the measurement-based metric for the candidate target link. In this case, then, making the link change decision may comprise selecting the candidate target link with the highest combined metric. In any of these embodiments, calculating the cumulative reward metric for each candidate target link may comprise calculating the cumulative reward metric also as a function of discounts applied to rewards earned for past link change decisions that selected the candidate target link. For example, the discount applied to a reward earned for a past link change decision may be a function of the outcome of that link change decision. Alternatively or additionally, the discount applied to a reward earned for a past link change decision may be a function of how long ago the link change decision was made.

In some embodiments, the link change decisions are handover decisions. In this case, method may be performed by network equipment in a wireless communication network, and may further comprise transmitting control signaling indicating the link change decision made. In one such embodiment, the network equipment comprises radio network equipment configured to make link change decisions selectively for wireless devices served by the radio network equipment. Alternatively or additionally, the method further comprises receiving rewards for, and outcomes of, respective link change decisions that select a target link served by different network equipment in the wireless communication network.

In some embodiments, the link change decisions are link reselection decisions. In this case, the method may be performed by a wireless device configured to make the link reselection decisions, and the method may further comprise performing a link change in accordance with the link change decision made.

Embodiments herein also include a method for supporting link change decision-making using reinforcement learning. The method comprises determining rewards earned for, and outcomes of, respective link change decisions. In some embodiments, possible outcomes of a link change decision to change a serving link of a wireless device to a target link include at least: a change of the serving link of the wireless device from the target link to another link; and a network-initiated disconnect of the wireless device from the target link. The method may also comprise signaling the determined rewards and outcomes to decision-making equipment that made the respective link change decisions.

In any of the above embodiments, the reward earned for a link change decision may characterize an extent to which the decision was successful up until the outcome of the link change decision occurred.

In some embodiments, the reward earned for a link change decision to change a serving link of a wireless device to a target link characterizes an extent to which the decision was successful as measured over a time period during which the wireless device was connected to, camped on, or attached via the target link.

In some embodiments, the reward earned for a link change decision to change a serving link of a wireless device to a target link is a function of two or more metrics, wherein the two or more metrics include two or more of: a metric that is a function of whether and/or how many sessions of the wireless device were dropped on the target link after the serving link of the wireless device was changed to the target link; a metric that is a function of a signal strength and/or quality measured by the wireless device on the target link after the serving link of the wireless device was changed to the target link; a metric that is a function of a per-service quality of experience for the wireless device on the target link after the serving link of the wireless device was changed to the target link; and a metric that is a function of time spent by the wireless device on the target link after the serving link of the wireless device was changed to the target link but before the outcome of the decision occurred.

In some embodiments, the reward is a weighted combination of normalized values of the two or more metrics.

In some embodiments, the reward earned for a link change decision to change a serving link of a wireless device to a target link is a function of a time spent metric. Here, time spent metric is a function of time spent by the wireless device on the target link after the serving link of the wireless device was changed to the target link but before the outcome of the decision occurred. And the time spent metric has a maximum value if the time spent is above a threshold and has a value calculated from the time spent if the time spent is below the threshold. In one such embodiment, the threshold depends on a type or velocity of the wireless device and/or depends on a deployment type of the target link.

In some embodiments, the possible outcomes of a cell change decision to change a serving link of a wireless device to a target link further include a device-initiated disconnect from the target link.

Embodiments herein also include corresponding apparatus, computer programs, and carriers (e.g., non-transitory computer-readable mediums). For example, embodiments herein include decision-making equipment configured for link change decision-making using reinforcement learning. The decision-making equipment is configured (e.g., via communication circuitry and processing circuitry) to track rewards earned for, and outcomes of, respective link change decisions. In some embodiments, possible outcomes of a link change decision to change a serving link of a wireless device to a target link include at least: a change of the serving link of the wireless device from the target link to another link; and a network-initiated disconnect of the wireless device from the target link. Regardless, the decision-making equipment is also configured to make a link change decision based on the tracked rewards and outcomes.

Embodiments further include network equipment for supporting link change decision-making using reinforcement learning. The network equipment may be configured (e.g., via communication circuitry and processing circuitry) to determine rewards earned for, and outcomes of, respective link change decisions. In some embodiments, possible outcomes of a link change decision to change a serving link of a wireless device to a target link include at least: a change of the serving link of the wireless device from the target link to another link; and a network-initiated disconnect of the wireless device from the target link. The network equipment may also be configured to signal the determined rewards and outcomes to decision-making equipment that made the respective link change decisions.

BRIEF DESCRIPTION OF THE DRAWINGS

FIG. 3 illustrates an algorithm for making a link change decision as a function of rewards earned for past link change decisions according to some embodiments.

DETAILED DESCRIPTION

Figure 1:
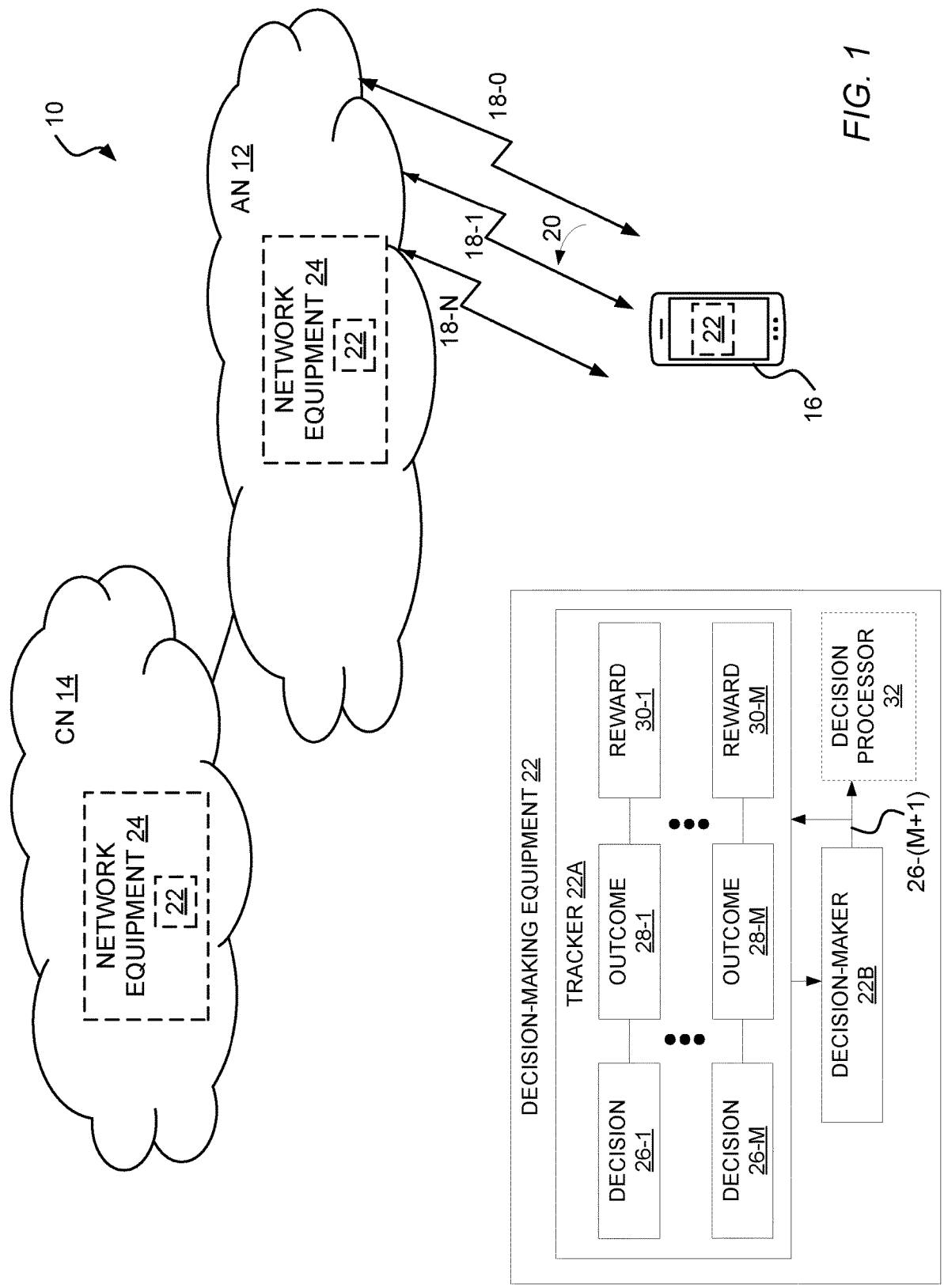
FIG. 1 is a block diagram of decision-making equipment in a wireless communication system according to some embodiments.

FIG. 1 illustrates a wireless communication network 10 according to one or more embodiments. As shown, the network 10 (e.g., a 5G network) may include an access network (AN) 12 and a core network (CN) 14. The AN 12 wirelessly connects a wireless communication device 16 (or simply "wireless device 16") to the CN 14. The CN 14 in turn connects the wireless device 16 to one or more external networks (not shown), such as a public switched telephone network and/or a packet data network (e.g., the Internet).

The AN 12 provides links via which the wireless device 16 may wirelessly access the system 10, e.g., using uplink and/or downlink communications. The AN 12 may for example provide links 18-0, 18-1, . . . 18-N (generally links 18) in the form of access nodes (e.g., base stations), cells, sectors, beams, or the like. Some links 18 may provide wireless coverage over different geographical areas.

The wireless device 16 may use any one or more of the links 18 to access the system 10, e.g., one link at a time, or even multiple links at a time using dual connectivity, carrier aggregation, or the like. Especially as the wireless device 16 engages in mobility so as to move around the system 10, the link(s) 20 that the wireless device 16 uses to access the system 10 may need to be changed, e.g., over time. As shown in FIG. 1, for instance, a link change 20 may need to be performed in order to change the link that the wireless device 16 uses to access the system 10 from link 18-0 to link 18-1.

While the wireless device 16 has an ongoing call or data session (e.g., in a so-called connected mode in which the device 16 has established a radio resource control, RRC, connection), the link(s) 18 that the wireless device 16 uses to access the system 10 (i.e., the serving link(s)) may be changed by way of a handover from a source link to a target link. On the other hand, while the wireless device 16 is not engaged in an ongoing call or data session (e.g., in a so-called idle or inactive mode in which the device 16 has no RRC connection or only an inactive RRC connection, respectively), the link(s) 18 that the wireless device 16 uses to access the system 10 (i.e., the serving link(s)) may be changed by way of reselection (e.g., cell reselection) from a source link to a target link.

FIG. 1 shows decision-making equipment 22 as equipment in the system 10 that makes a link change decision for the wireless device 16 so as to decide if and/or to which target link the wireless device 16 is to change. Where for example the link change decision amounts to a handover decision (e.g., while the wireless device 16 has an ongoing call or data session), the decision-making equipment 22 may be or be comprised in network equipment 24 in the AN 12 or CN 14, such that the link change decision is network controlled. The network equipment 24 may for instance be or be included in radio network equipment in the AN 12, e.g., such that decision-making is distributed in the system 10, with each radio network equipment making link change decisions selectively for wireless devices served by that radio network equipment. Alternatively, the network equipment 24 may be equipment in the CN 14 responsible for mobility management (e.g., a mobility management entity, MME, or an access and mobility function, AMF). Where the link change decision amounts to a reselection decision, by contrast, the decision-making equipment 22 may be or be comprised in the wireless device 16 itself, e.g., such that the link change decision is at least partially device controlled.

According to some embodiments herein, the decision-making equipment 22 performs link change decision-making using reinforcement learning. The decision-making equipment 22 makes a link change decision in this regard based on rewards earned for, and outcomes of, previous link change decisions. The outcome of a previous decision to change the wireless device 16 to a target link notably characterizes how the decision ultimately turned out with respect to the target link. In some embodiments, for example, the outcome reflects how the wireless device 16 eventually became detached or disconnected from the target link after the decision was made and carried out. Possible outcomes may thereby include the wireless device 16 changing from the target link to yet another link, or the network initiating disconnect of the device 16 from the target link (e.g., dropped call due to network fault such as overload). The outcomes for link change decisions in this way provide insight into how good or bad those decisions ultimately ended up being over a relatively longer term than conventional short-term decision making. Exploiting reinforcement learning based on such outcomes of past decisions, the decision-making equipment 22 advantageously learns over time which link change decisions ultimately prove more suitable or successful.

In fact, in some embodiments, the decision-making equipment 22 alternatively or additionally performs device-specific reinforcement learning so as to learn on a device-by-device basis. A link change decision for a wireless device may therefore be based selectively on the rewards for and outcomes of link change decisions previously made for that specific device. These embodiments may thereby advantageously tailor link change decision-making to the unique nature of any given device, e.g., so as to account for the type or class of the device, how a certain device tends to move in space, or service demands imposed by the particular device. This allows some embodiments to make link change decisions that optimize or otherwise take into account the impact of those decisions on the specific device's performance or quality of service.

FIG. 1 more particularly shows that the decision-making equipment 22 may include a tracker 22A and decision-maker 22B in order to perform link change decision-making using reinforcement learning. The tracker 22A tracks rewards earned for, and outcomes of, respective link change decisions. The tracker 22A in some embodiments tracks these rewards earned for, and the outcomes of, respective link change decisions for each individual wireless device, so as to associate each link change decision and its resulting reward and outcome with the particular wireless device for which the decision was made. The tracker 22A may perform tracking by for instance storing information in a data structure (e.g., a table, database, etc.) indicating the rewards for and outcomes of link change decisions. The tracker 22A in some embodiments may also store information indicating the wireless device for which a respective decision was made, e.g., by storing an identifier of the wireless device and/or an identifier of a subscription or subscriber associated with the wireless device (e.g., an international mobile subscriber identifier, IMSI). As shown, the tracker 22A tracks each link change decision 26-1 . . . 26-M made by the decision-making equipment 22, e.g., in terms of an identity of the target link to which the decision decides to change the wireless device 16 and optionally an identity of the source link from which the decision decides to change the wireless device 16. The tracker 22A may do so for instance based on receiving feedback from the decision-maker 22B in terms of each link change decision that it makes.

The tracker 22A also tracks the outcomes 28-1 . . . 28-M of the respective link change decisions 26-1 . . . 26-M. Possible outcomes of a link change decision to change a serving link of the wireless device 16 to a target link include at least: (i) a change of the serving link of the wireless device 16 from the target link to another link; and (ii) a network-initiated disconnect of the wireless device 16 from the target link (e.g., dropped call due to network fault such as overload). In some embodiments, the possible outcomes may further include a device-initiated disconnect of the wireless device 16 from the target link, or at least certain kinds of device-initiated disconnects (e.g., ungraceful ones). Alternatively or additionally, the possible outcomes of a decision may include one or more other types of outcomes that reflect how the wireless device 16 eventually became detached or disconnected from the target link after the decision was made and carried out.

Especially in embodiments such as these where the outcome of a link change decision characterizes how the decision ultimately turned out with respect to the target link, the tracker 22A may track these outcomes with assistance or feedback from network equipment that serves the target link. In some embodiments, for example, where the decision-making equipment 22 is or is located in source radio network equipment that serves the source link of a link change, the decision-making equipment 22 may receive from target radio network equipment (that serves the target link of the link change) feedback indicating the outcome of the link change decision. The target radio network equipment may for instance send this feedback to the source radio network equipment upon occurrence of the outcome, e.g., via inter radio network equipment signaling (e.g., X2 signaling). The feedback in some embodiments may also indicate the reward earned for the decision, or metric(s) based on which the reward may be determined.

The tracker 22A in these and other embodiments further tracks the rewards 30-1 . . . 30-M earned for the respective link change decisions 26-1 . . . 26-M. In some embodiments, each reward 30-1 . . . 30-M characterizes an extent to which the decision for which it was earned was "successful", e.g., according to one or more indicators or metrics, such as quality of service, QoS. This extent of success may equivalently be viewed as an extent of failure. Regardless, in some of these embodiments, each reward characterizes an extent to which the decision for which it was earned was successful up until the outcome of the decision occurred and/or as measured over a time period during which the wireless device 16 was connected to, camped on, or attached via the target link. Each reward 30-1 . . . 30-M may characterize this extent qualitatively or quantitatively, at any level of granularity. In some embodiments, for instance, each reward 30-1 . . . 30-M qualitatively and coarsely characterizes the decision for which it was earned as being either a "success" or "failure", e.g., as encoded as either a "1" or "0". In other embodiments, each reward 30-1 . . . 30-M quantitatively characterizes the extent to which the decision for which it was earned was "successful" as a numerical metric, e.g., with any fractional value from 0 to 1.

More particularly, the reward earned for a link change decision to change a serving link of a wireless device to a target link in some embodiments is a function of (e.g., a weighted combination of) two or more metrics. In one such embodiment, for instance, each of the two or more metrics is normalized, e.g., to have a value between 0 and 1, where a value of 1.0 is associated with an absolutely successful link change decision. In this case, the reward is a weighted combination of such normalized values for the two or more metrics.

The two or more metrics may include for instance a metric that is a function of whether and/or how many sessions of the wireless device were dropped on the target link, until the outcome of the decision occurred. Dropped sessions in this regard may contribute negatively to the reward amount, e.g., in order to disincentivize future link change decisions from changing to a target link that proves problematic in terms of dropped sessions. In one embodiment, the reward or a component of the reward may be a function of a dropped call metric $c_{fail}$ where:

$$c_{fail} = 1 - \frac{c_{dropped}}{c_{total}}$$

Here, $c_{dropped}$ is the number of sessions dropped and $c_{total}$ is the total number of sessions that the wireless device established before the outcome of the link change decision occurred.

Alternatively or additionally, the two or more metrics may include a metric that is a function of a signal strength and/or quality measured by the wireless device on the target link after the serving link of the wireless device was changed to the target link. Signal strength may for instance be reflected by a received signal strength indicator (RSSI) metric $m_{RSSI}$ that normalizes different ranges of RSSI into different values between 0 and 1. As one example, $m_{RSSI}=1.0$ may indicate an RSSI greater than −70 dBm, $m_{RSSI}=0.8$ may indicate an RSSI between −70 dBm and −85 dBm, $m_{RSSI}=0.6$ may indicate an RSSI between −86 dBm and −100 dBm, $m_{RSSI}=0.4$ may indicate an RSSI between −100 dBm and −110 dBm, and $m_{RSSI}=0.2$ or 0.0 may indicate an RSSI of −110 dBm (no signal).

In other embodiments, the two or more metrics may alternatively or additionally include a metric that is a function of a per-service quality of experience for the wireless device on the target link after the serving link of the wireless device was changed to the target link. In one embodiment, for instance, this may include full (i.e., no reference) service quality metrics. In this case, the user data (e.g., media) transferred via the target link may be decoded in order to estimate the perceived audio/video quality to be estimated in terms of audio/video degradations. P.862 is an example for audio. As another example, the per-service quality of experience may include parameter-based service-specific quality metrics such as Service Quality Indicator (SQI) for speech or P.1203 for video. These scores can be normalized between 0 and 1. For example, a mean opinion score (MOS) with a nominal value between 0 and 5 may be normalized into a reward range between 0 and 1 as:

$$R_{QOS} = \frac{(MOS - 1)}{4}.$$

Note that in any of these embodiments the per-service quality of experiences may be summed or otherwise combined when multiple services are at issue.

In yet other embodiments, the two or more metrics may alternatively or additionally include a time spent metric that is a function of time spent by a wireless device on the target link after the serving link of the wireless device was changed to the target link but before the outcome of the decision occurred (e.g., before the next link change or network-initiated disconnect). In one such embodiment, if the time spent is higher than a threshold, the link change decision is deemed successful and the time spent metric has a maximum value (e.g., 1.0). If on the other hand, the time spent is less than the threshold, then the link change decision is deemed unsuccessful, or at least less successful, and the time spent metric has a value less than its maximum. One example formula for calculating a time spent metric $t_{spent}$ based on time spent and a threshold of 30 minutes is:

$$t_{spent} = \begin{cases} 1 & \text{if } t_{spent} \geq 30 \\ \frac{t_{spent}}{30} & \text{if } t_{spent} < 30 \end{cases}.$$

In these and other embodiments, then, the time spent threshold may have a maximum value if the time spent is above the threshold but have a value calculated from the time spent if the time spent is below the threshold. Note although the threshold was exemplified as fixed in the example above, the threshold in other embodiments may depend on a type or velocity of a wireless device and/or depend on a deployment type of the target link. For example, wireless devices that are highly mobile (either based on their type or based on their actual velocity) may have a lower threshold to meet than less mobile devices in order for link change decisions to be deemed successful from the perspective of the time spent metric, e.g., since highly mobile devices like connected cars may naturally spend less time in the target link's coverage area than less mobile devices like mobile phones because of their higher velocity. As another example, the threshold in city areas (e.g., large shopping centers or offices) may be higher than for example rural areas where people just travel through. In either case, the decision-making equipment 22 may maintain or retrieve a mapping of thresholds to wireless devices, wireless device types, or deployment types in order to dynamically apply appropriate threshold as described above.

No matter the particular nature of the two or more metrics, the reward may be defined as a weighted combination of those metrics. In one example, for instance, the reward may be computed as a weighted average of the two or more metrics, e.g., as:

$$\text{reward} = \frac{t_{spent} \cdot w_1 + c_{fail} \cdot w_2 + m_{RSSI} \cdot w_3}{3}$$

where the weights $w_1$, $w_2$, $w_3$ are the weights respectively applied to the individual metrics according to the weighted average.

In any event, the decision-maker 22B evaluates the tracked rewards 30-1 . . . 30-M earned for, and outcomes 28-1 . . . 28-M of, respective link change decisions 26-1 . . . 26-M in order to make a link change decision 26-(M+1). In fact, in some embodiments, the decision-maker 22B makes a link change decision 26-(M+1) for a wireless device based selectively on the rewards and outcomes tracked for link change decisions previously made for that wireless device or for the same type of wireless device. Regardless, a decision processor 32 at the decision-making equipment 22 may then process the decision 26-(M+1) in order to take action(s), such as controlling execution of the link change decision. Where the decision-making equipment 22 is located in the AN 12 or CN 14, the decision processor 32 may trigger or perform control signaling towards the wireless device 16 to instruct or command the wireless device 16 to execute the link change decision (e.g., handover decision). Or, where the decision-making equipment 22 is located in the wireless device 16 itself, the decision processor 32 may actually trigger or perform the link change decision (e.g., link reselection decision).

No matter what action(s) are performed after making the link change decision, the decision-maker 22B in some embodiments may be described as making a current link change decision 26-(M+1) based on the rewards 30-1 . . . 30-M earned for, and outcomes 28-1 . . . 28-M of, past link change decisions 26-1 . . . 26-M. Past link change decisions whose rewards and outcomes characterize those decisions as more favorable or successful may positively reinforce the decision-maker 22B to make the current link change decision in the same or a similar way. The decision-maker 22B may for instance be configured to make the current link change decision 26-(M+1) with a goal of maximizing the reward that will be earned for the decision and/or achieving a favorable outcome of the decision.

Figure 2:
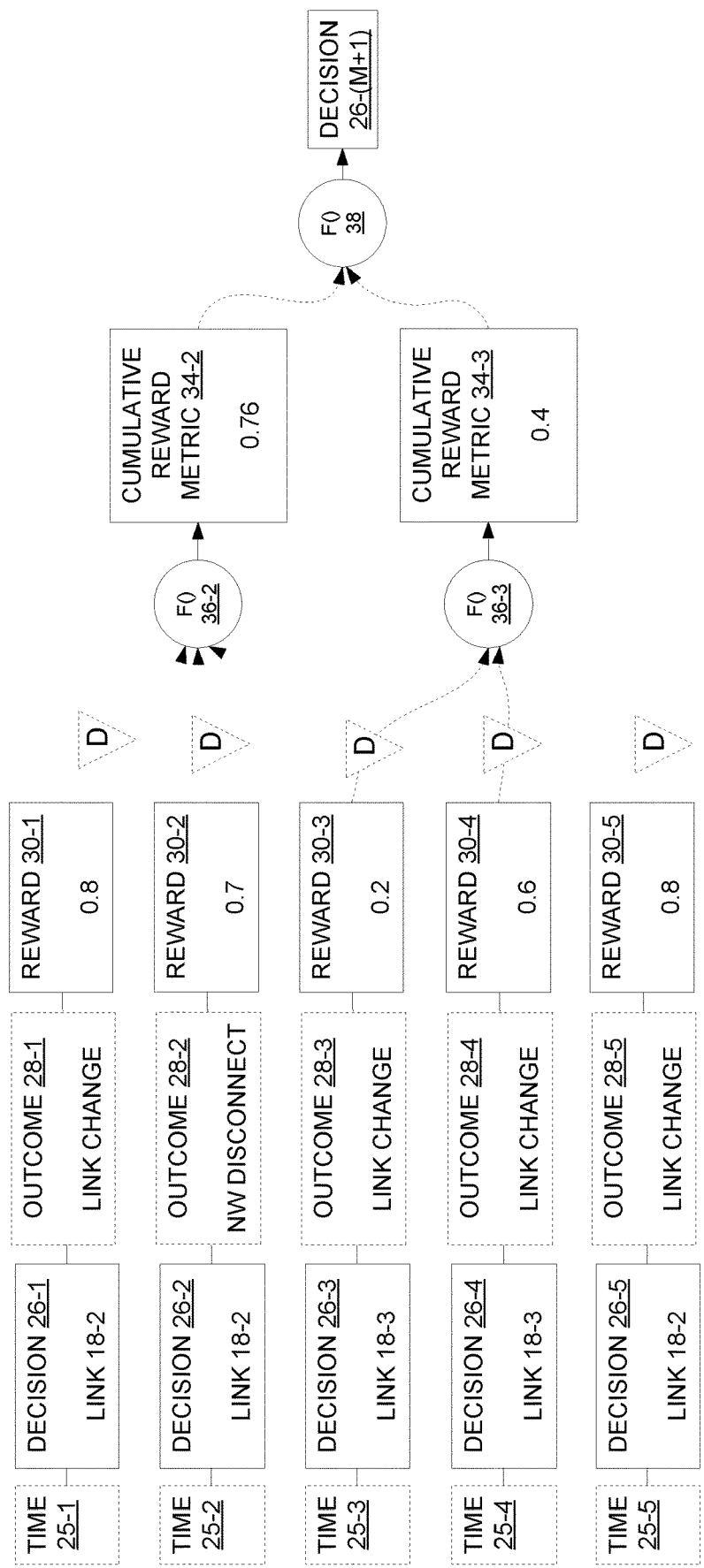
FIG. 2 is a block diagram of decision-making processing logic according to some embodiments.

In some embodiments, for example, the decision-maker 22B calculates a cumulative reward metric for each candidate target link that is a candidate for the link change decision 26-(M+1) to be made. The cumulative reward metric for each candidate target link may be calculated as a function of the rewards earned for past link change decisions that selected the candidate target link. The decision-maker 22B may then calculate the link change decision as a function of the cumulative reward metrics calculated for the candidate target links, e.g., by selecting the candidate target link with the highest (e.g., maximum) cumulative reward metric. FIG. 2 shows one example in this regard.

As shown in FIG. 2, past link change decisions 26-1, 26-2, and 26-5 have selected link 18-2 as the target link. For decision 26-1 that selected link 18-2, a reward 30-1 of 0.8 was earned. For decision 26-2 that selected link 18-2, a reward 30-2 of 0.7 was earned. And for decision 26-5 that selected link 18-2, a reward 30-5 of 0.8 was earned. Past link change decisions 26-3 and 26-4 by contrast selected link 18-3 as the target link. For decision 26-3 that selected link 18-3, a reward 30-3 of 0.2 was earned. And for decision 26-4 that selected link 18-3, a reward 30-4 of 0.6 was earned. For link change decision 26-(M+1), the decision-maker 22B considers links 18-2 and 18-3 as candidate target links. The decision-maker 22B therefore calculates a cumulative reward metric 34-2 for link 18-2 as a function F( ) 36-2 of the rewards 30-1, 30-2, and 30-5 respectively earned for past link change decisions 26-1, 26-2, and 26-5 that selected link 18-2. As shown, this function F( ) 36-2 may correspond to an average, such that the cumulative reward metrics 34-2 for link 18-2 is the average of the individual rewards 30-1, 30-2, and 30-5 (e.g., 0.76 in this example). Similarly, the decision-maker 22B calculates a cumulative reward metric 34-3 for link 18-3 as a function F( ) 36-3 of the rewards 30-3 and 30-4 respectively earned for past link change decisions 26-3 and 26-4 that selected link 18-3. And as shown this function F( ) 36-3 may also correspond to an average, such that the cumulative reward metrics 34-3 for link 18-3 is the average of the individual rewards 30-3 and 30-4 (e.g., 0.4 in this example).

In some embodiments, though, discounts D may be applied to rewards earned for respective link change decisions, so as to affect the calculation of the cumulative reward metrics. The discounts applied to a reward earned for a decision may for instance be a function of how long ago the decision was made. As shown in FIG. 2, for instance, a discount D (if any) applied to the reward 30-1 earned for the decision 26-1 may be a function of the time 25-1 at which the decision 26-1 was made (e.g., as specified in epoch format). A discount D (if any) applied to the reward 30-2 earned for the decision 26-2 may similarly be a function of the time 25-2 at which the decision 26-2 was made. And so on. In some embodiments, such discounts D may effectively discount rewards for older decisions, e.g., since the situation on the target link may change as time passes and thereby become less reliable as positive reinforcement. In one embodiment, for example, the discount $D_x$ applied to the reward for a decision x may be computed as $$D_x = 1 - \frac{timestamp_x}{currentTime},$$

where $timestamp_x$ is the time in epoch format at which the decision x was made and currentTime is the current time in epoch format.

Alternatively or additionally, the discounts applied to a reward earned for a decision may be a function of the outcome of that decision. As shown in FIG. 2, for instance, a discount D (if any) applied to the reward 30-1 earned for the decision 26-1 may be a function of the decision's outcome 28-1 (which as shown was a subsequent link change from the target link to another link). A discount D (if any) applied to the reward 30-2 earned for the decision 26-2 may similarly be a function of the decision's outcome 28-2 (which as shown was a network-initiated disconnect of the wireless device). And so on. In some embodiments, such discounts may effectively discount rewards for decisions that have undesirable outcomes such as a network-initiated disconnect of the wireless device. In some embodiments, for example, any reward greater than a certain threshold (e.g., 0.5) is discounted down to that threshold if the reward was earned for a decision that resulted in network-initiated disconnection, e.g., so as to cap the possible reward at the threshold. As applied to the example in FIG. 2, then, even though the reward 30-2 earned for decision 26-2 was 0.7, the outcome 28-2 of the decision 26-2 being network-initiated disconnect results in a discounting of that reward 30-2 down to 0.5 for purposes of calculating the cumulative reward metric 34-2 (i.e., the metric 34-2 will be 0.7 rather than 0.76). A network-initiated disconnect may for instance include instances where the wireless device, due to fault of the network, lost connection to the target link after having changed to it, and in some embodiments did not or was not able to connect again to the target link. Where the outcome of a decision was favorable, or neither favorable nor undesirable, no discount may be applied. Such may be the case for instance if the outcome was another link change, or a (graceful) device-initiated disconnect (e.g., ending a phone call or turning off data).

Regardless of how the cumulative reward metrics 34-2, 34-3 are calculated, the decision-maker 22B may then make the link change decision 26-(M+1) as a function F( ) 38 of the cumulative reward metrics 34-2 and 34-3 calculated for the candidate target links 18-2 and 18-3. In some embodiments, the function F( ) 38 is a maximum function, such that the decision-maker 22B selects the candidate target link with the highest cumulative reward metrics, e.g., candidate target link 18-2 in this example. FIG. 3 shows a simple example algorithm for making a link change decision in this case based selectively on past link change decisions for a specific wireless device, e.g., as associated with a certain IMSI. As shown in this example, the decision-maker 22B retrieves all tracked link change decisions for a certain wireless device as associated with a certain IMSI. The decision-maker 22B may then group the retrieved decisions into different sets $Set_k$ associated with different target links $Target_k$, where k=1, . . . K. For each $Set_k$ containing j=0, . . . J decisions, the decision-maker 22B computes a cumulative reward $C_k$ as $$C_k = \sum_{j=0}^{J} \left( \frac{Reward_j \cdot Discount_j}{J} \right),$$

where $Reward_j$ is the reward earned for $Decision_j$ and $Discount_j$ is the discount to apply to $Reward_j$. The decision-maker 22B then returns the $Target_k$ for $$\underset{k}{\operatorname{argmax}} C_k$$

so as to return the target link with the maximum cumulative reward.

Figure 4:
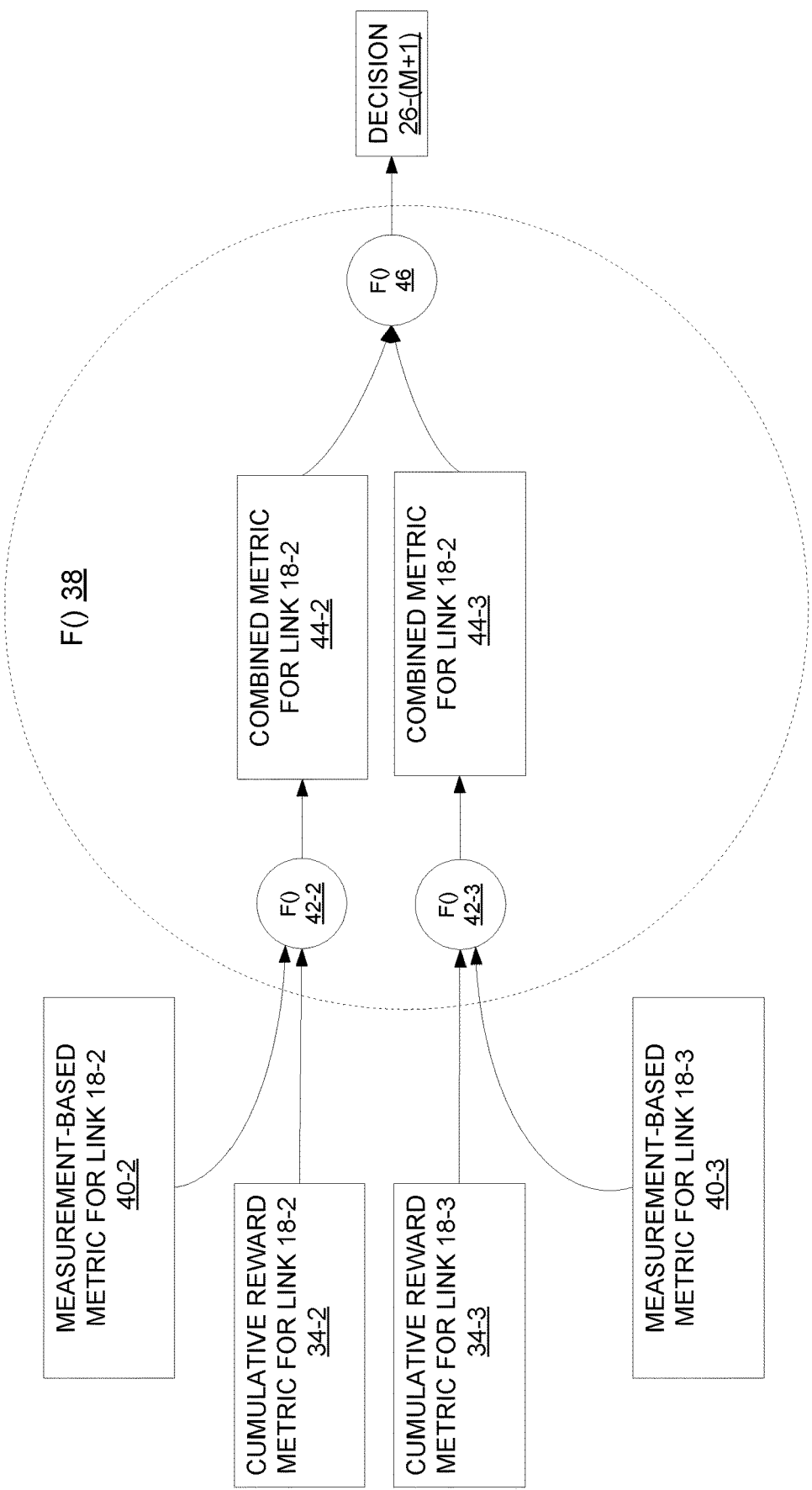
FIG. 4 is a block diagram of decision-making processing logic according to other embodiments.

In other embodiments, the function F( ) 38 is a function of both the cumulative reward metrics calculated for the candidate target links and measurement-based metrics calculated for the candidate target links. In one embodiment, for instance, the decision-maker 22B obtains for each candidate target link a measurement-based metric as a function of a measurement on the candidate target link (e.g., a reference signal received power (RSRP) measurement, a reference signal received quality (RSRQ) measurement, or other measurement reported with a radio resource control, RRC, measurement report). In this case, the decision-maker 22B may calculate for each candidate target link a combined metric as a function (e.g., weighted combination) of the cumulative reward metric and the measurement-based metric for the candidate target link, and then make the link change decision based on the combined metrics. These embodiments may thereby exploit reinforcement learning, as represented by the cumulative reward metric, to only partially influence the link change decision in conjunction with 'classical' measurement report based approaches. FIG. 4 illustrates these embodiments in the context of the example from FIG. 2.

As shown in FIG. 4, the decision-maker 22B makes the link change decision 26-(M+1) as a function F( ) 38 of not only the cumulative reward metrics 34-2, 34-3 for candidate target links 18-2, 18-3, but also of measurement-based metrics 40-2, 40-3 for the candidate target links 18-2, 18-3.

In particular, the decision-maker 22B obtains for the candidate target links 18-2 and 18-3 measurement-based metrics 40-2 and 40-3. Measurement-based metrics 40-2 is a function of a measurement on candidate target link 18-2, whereas measurement-based metric 40-3 is a function of a measurement on candidate target link 18-3. The decision-maker 22B calculates for candidate target link 18-2 a combined metric 44-2 as a function F( ) 42-2 (e.g., a weighted combination) of the cumulative reward metric 34-2 for link 18-2 and the measurement-based metric 40-2 for link 18-2. Similarly, the decision-maker 22B calculates for candidate target link 18-3 a combined metric 44-3 as a function F( ) 42-3 (e.g., a weighted combination) of the cumulative reward metric 34-3 for link 18-3 and the measurement-based metric 40-3 for link 18-3. The decision-maker 22B then makes the link change decision based on those combined metrics 44-2, 44-3, such as by selecting the candidate target link with the highest combined metric 44-2 or 44-3.

Consider a simple example where the functions 42-2 and 42-3 constitute weighted average functions. Let $L=\{L_1, \ldots L_K\}$ be the set of K candidate target links, let $M_m(L_k)$ be the measurement-based metric for link k in L, and let $M_r(L_k)$ be the cumulative reward metric for link k in L. Then, the combined metric $c_k$ for candidate target link k may be calculated in some embodiments as $$c_k = \frac{(M_m(L_k) \times w_m) + (M_r(L_k) \times w_r)}{2}$$

where $w_m$ is the weight applied to the measurement-based metric $M_m(L_k)$ and $w_r$ is the weight applied to the cumulative reward metric $M_r(L_k)$. The decision-maker 22B may then select the candidate target link k with the largest combined metric $c_k$.

Note that decision-maker 22B as suggested above may broadly make a current link change decision based on the rewards earned for, and outcomes of, all past link change decisions without qualification, or may instead make the current link change decision based selectively on the rewards earned for, and outcomes of, only certain past link change decisions. The certain past link change decisions may for instance be only those made for the same wireless device or the same type of wireless device as the one for whom the current link change decision is being made. Alternatively or additionally, the certain past link change decisions may be those that are of the same type as the current link change decision, e.g., in terms of an intra-frequency, inter-frequency, inter radio access technology, RAT, intra-RAT, etc. Alternatively or additionally, the certain past link change decisions may be those that were made in the same environment or context as that within which the current link change decision is to be made. The environment or context here may encompass environmental or contextual qualities such as time-of-day, weather conditions, or the like. Or, rather than or in addition to impacting which past link change decisions are considered for making the current link change decision, the wireless device type, link change decision type, and/or environment or context may be accounted for in any discount applied to rewards earned for those past link change decisions. For example, past link change decisions made at a different time-of-day and/or under different weather conditions may be considered but the rewards of those past link change decisions may be discounted so as not to impact the current link change decisions as much as other past decisions made at the same time-of-day or under the same weather conditions.

Figure 5:
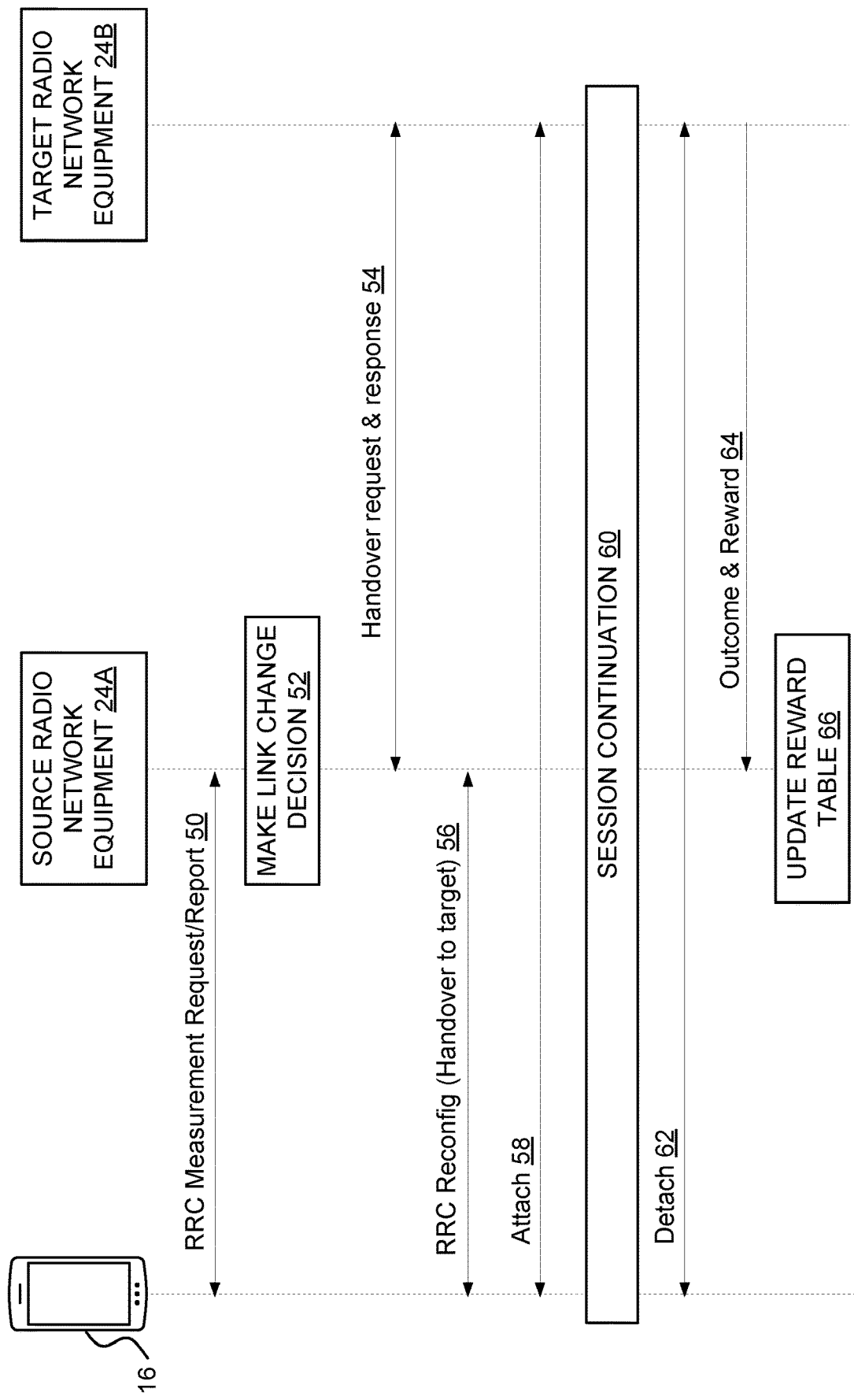
FIG. 5 is a call flow diagram for supporting link change decision making according to some intra-RAT link changes embodiments.
Figure 6:
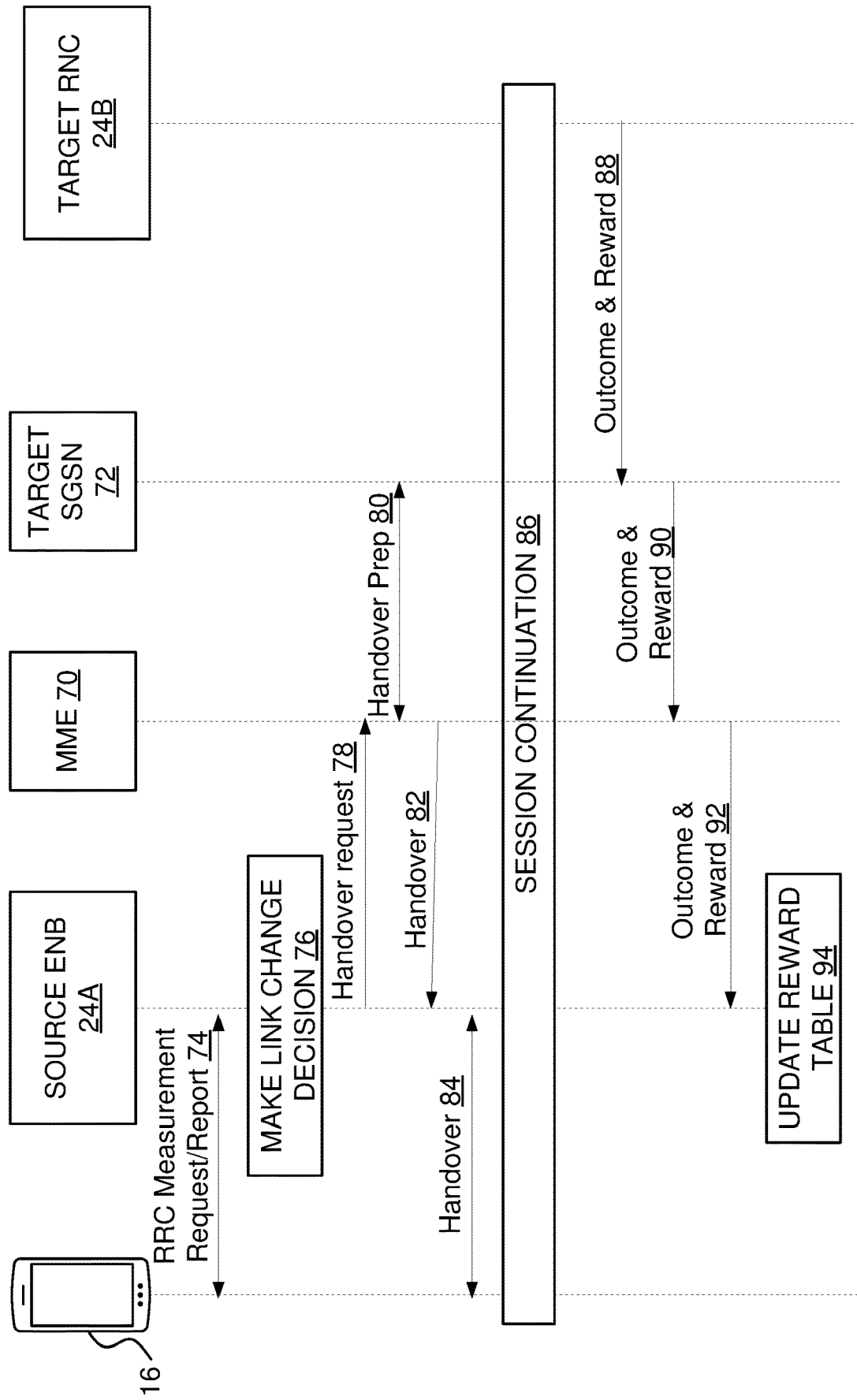
FIG. 6 is a call flow diagram for supporting link change decision making according to some inter-RAT link changes embodiments.

FIGS. 5 and 6 now illustrate some embodiments herein as applicable to different types of link change decisions; namely intra-RAT and inter-RAT link change decisions. As shown in FIG. 5 for the intra-RAT case, the wireless device 16 transmits a measurement report to the source radio network equipment 24A, e.g., in response to a request for such a report and/or via an RRC message (Step 50). The source radio network equipment 24A as shown makes a link change decision (Step 52), which may be based on the measurement report and/or exploit reinforcement learning. The source radio network equipment 24A then sends a handover request to the target radio network equipment 24B and receives a response back (Step 54). The source radio network equipment 24A then commands the wireless device 16 to perform handover via an RRC Reconfiguration message (Step 56). The wireless device 16 then attaches to the target radio network equipment 24B as part of performing the commanded handover. The wireless device 16 then engages in a call or data session with the target radio network equipment 24B (Step 60). The outcome of the handover decision in Step 52 may then occur in the form of detachment from the target radio network equipment 24B (Step 62). Such detachment may occur due to subsequent handover, network-initiated disconnection, or some other reason. After or upon occurrence of such detachment, though, the target radio network equipment 24B transmits information to the source radio network equipment 24A indicating the outcome and/or the reward earned for the link change decision 52 (Step 64). The source radio network equipment 24A may then update a table it maintains indicating the rewards and/or outcomes of the link change decisions (Step 66).

FIG. 6 shows the inter-RAT case in an example context for handover from LTE to UMTS. In this case, there is no inter-base station interface (e.g., no X2) interface for the UMTS radio network controller (RNC) to communicate the reward and/or outcome with the LTE eNB. Accordingly, the reward and/or outcome may be relayed through core network nodes, e.g., the serving gateway support node (SGSN) of the UMTS core network and the mobility management entity (MME) of the LTE core network. In particular, as shown in FIG. 6, the wireless device 16 transmits a measurement report to the source eNodeB 24A, e.g., in response to a request for such a report and/or via an RRC message (Step 74). The source eNodeB 24A as shown makes a link change decision (Step 76), which may be based on the measurement report and/or exploit reinforcement learning. The source eNodeB 24A then sends a handover request to the MME 70 (Step 78). The MME 70 then performs a handover preparation procedure with the target SGSN (Step 80). The handover is then performed at steps 82 and 84. The wireless device 16 then engages in a call or data session with the target RNC 24B (Step 86). The outcome of the handover decision in Step 76 may then occur in the form of detachment from the target RNC 24B. Such detachment may occur due to subsequent handover, network-initiated disconnection, or some other reason. After or upon occurrence of such detachment, though, the target RNC 24B transmits information towards the source eNodeB 24A (i.e., via the target SGSN 72 and MME 70) indicating the outcome and/or the reward earned for the link change decision 76 (Steps 88, 90, and 92). The source eNodeB 24A may then update a table it maintains indicating the rewards and/or outcomes of the link change decisions (Step 94).

Although illustrated in this example and in other embodiments as the link change decision being performed by a base station, the network equipment making this decision using reinforcement learning may reside anywhere in the network. In some embodiments, for example, core network equipment (e.g., an MME or equipment implementing an access and mobility function, AMF) may make the link change decisions. In this case, the core network equipment may be the one storing reward tables as described in the above examples. Accordingly, then, when a serving base station is about to decide to handover a wireless device to a target base station, the serving base station asks the core network equipment to decide for the IMSI belonging to the wireless device. The decision is relayed back to the serving base station, which continues the handover process.

Generally, some embodiments herein provide feedback to source radio network equipment with regard to performance of the wireless device in target radio network equipment of a link change. The feedback may enable the source radio network equipment to learn over time what decisions lead to better results, using a reinforcement learning approach. In such an approach, every link change decision results in a reward to the source radio network equipment. In order to maximize the reward, the source radio network equipment must be able to initially experiment with different neighboring radio network equipment. This rewarding process may continue indefinitely, as the favorable or unfavorable situation for a target radio network equipment may change. The decisions may be done per wireless device or subscriber using their IMSI, as different wireless devices may exhibit different characteristics (e.g., with respect to how the wireless device moves in space).

Some embodiments exploit this reinforcement learning approach in order to optimize service key performance indicators (KPIs) for a wireless device, e.g., to make sure that vehicles on a mission-critical network slice are handed over to the best radio network equipment possible. That is, some embodiments optimize link change decisions from an enterprise/device service perspective. Some embodiments provide a mechanism for link changes using historical data of the impact of past decisions on the network and/or service KPIs. The applicability and value of these approaches may generally increase with ultra-dense deployments of radio network equipment where there are many choices for link changes. Moreover, some embodiments piggyback on existing telecom standards.

Figure 7:
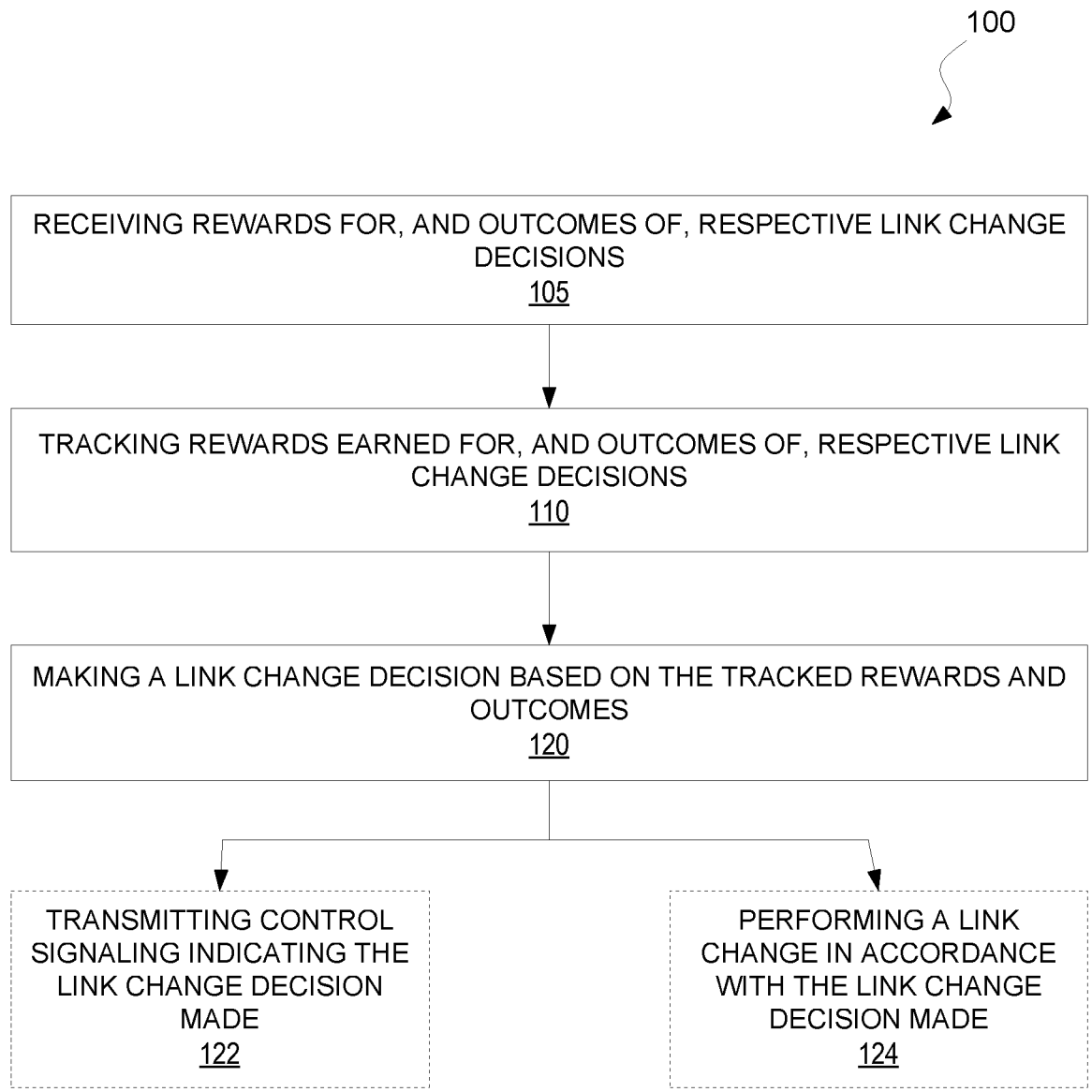
FIG. 7 is a logic flow diagram of a method for link change decision-making using reinforcement learning according to some embodiments.

In view of the above modifications and variations, FIG. 7 illustrates a method 100 performed by the decision-making equipment 22 for link change decision-making using reinforcement learning according to some embodiments. The method 100 as shown includes tracking rewards 30-1, . . . 30-M earned for, and outcomes 28-1, . . . 28-M of, respective link change decisions 26-1, . . . 26-M (Block 110). In some embodiments, possible outcomes of a link change decision to change a serving link of the wireless device 16 to a target link include at least: (i) a change of the serving link of the wireless device 16 from the target link to another link; and (ii) a network-initiated disconnect of the wireless device 16 from the target link (e.g., dropped call due to network fault such as overload). In some embodiments, the possible outcomes may further include a device-initiated disconnect of the wireless device 16 from the target link, or at least certain kinds of device-initiated disconnects (e.g., ungraceful ones). Alternatively or additionally, the possible outcomes of a decision may include one or more other types of outcomes that reflect how the wireless device 16 eventually became detached or disconnected from the target link after the decision was made and carried out. No matter the particular nature of the rewards and/or outcomes, though, tracking may be facilitated or be based on receiving the rewards for, and outcomes of, respective link change decisions, e.g., from radio network equipment that serves the respective target links.

Regardless, the method 100 as shown also includes making a link change decision 26-(M+1) based on the tracked rewards and outcomes (Block 120). In fact, in some embodiments, this entails making a link change decision 26-(M+1) for a wireless device based selectively on the rewards and outcomes tracked for link change decisions previously made for that wireless device or for the same type of wireless device.

In any event, the method 100 may further include processing the decision 26-(M+1) in order to take action(s), such as controlling execution of the link change decision. As shown, for example, the method 100 may include transmitting control signaling indicating the link change decision made (Block 122) or performing a link change in accordance with the link change decision made (Block 124).

Figure 8:
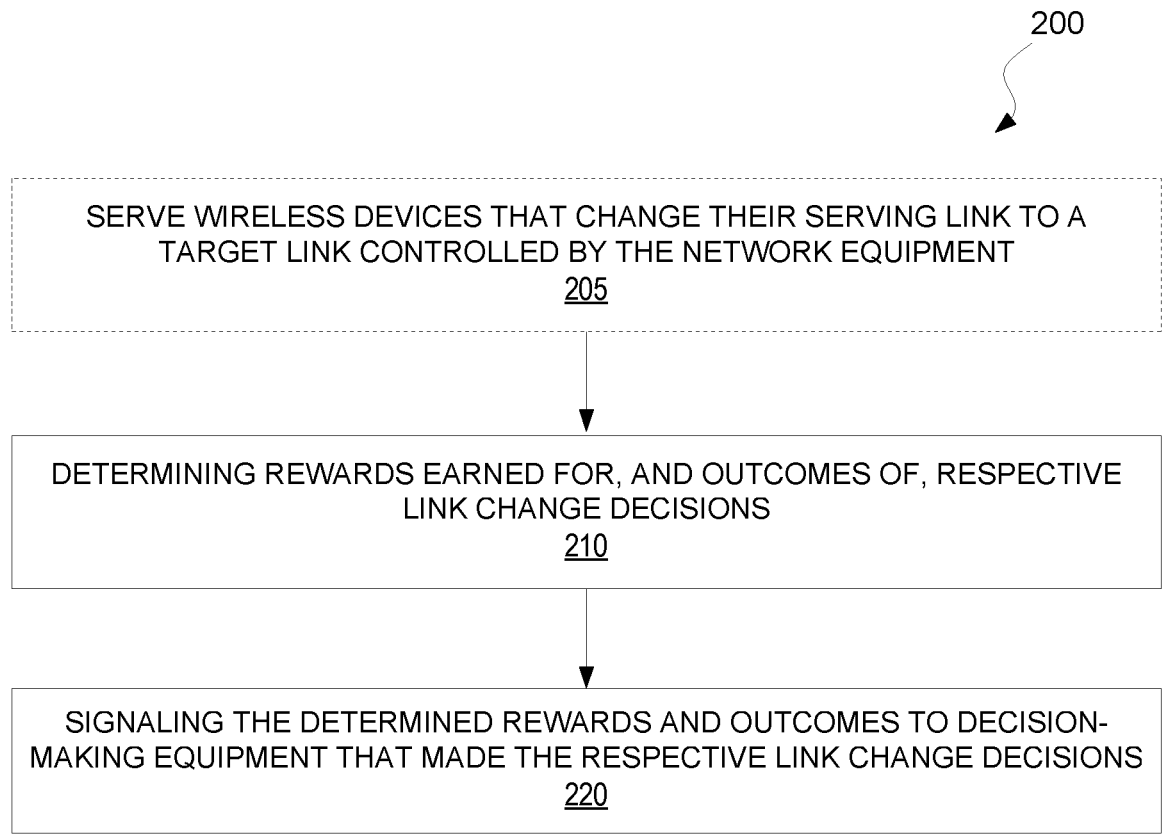
FIG. 8 is a logic flow diagram of a method for supporting link change decision-making using reinforcement learning according to some embodiments.

FIG. 8 shows a method 200 (e.g., performed by network equipment) for supporting link change decision-making using reinforcement learning according to some embodiments. The method 200 as illustrated includes determining rewards 30-1, . . . 30-M earned for, and outcomes 28-1, . . . 28-M of, respective link change decisions 26-1, . . . 26-M (Block 210). In some embodiments, possible outcomes of a link change decision to change a serving link of the wireless device 16 to a target link include at least: (i) a change of the serving link of the wireless device 16 from the target link to another link; and (ii) a network-initiated disconnect of the wireless device 16 from the target link (e.g., dropped call due to network fault such as overload). In some embodiments, the possible outcomes may further include a device-initiated disconnect of the wireless device 16 from the target link, or at least certain kinds of device-initiated disconnects (e.g., ungraceful ones). Alternatively or additionally, the possible outcomes of a decision may include one or more other types of outcomes that reflect how the wireless device 16 eventually became detached or disconnected from the target link after the decision was made and carried out. Where the rewards are quantitative in nature, determination of the rewards may entail computing those rewards, e.g., as described according to various embodiments above.

In any eve, the method 200 as shown may also include signaling the determined rewards and outcomes to decision-making equipment 22 that made the respective link change decisions (Block 220). Note that the determining and signaling may be performed for each link change decision responsive to and/or after the outcome of that decision has occurred. Accordingly, in some embodiments, the method may also include serving wireless devices that change their serving link to a target link controlled by the network equipment that performs the method (e.g., the target radio network equipment) (Block 205).

Note that the decision-making equipment 22 herein may be implemented by any node or equipment in the system 10. In some embodiments, the decision-making equipment 22 is or is included in the wireless device 16. In other embodiments, the decision-making equipment 22 is or is included in network equipment, which may be core network equipment or radio network equipment. For example, the decision-making equipment 22 may be or be included in source radio network equipment that serves a source link of a link change. The decision-making equipment 22 may perform the methods herein and any other processing by implementing any functional means, modules, units, or circuitry. In one embodiment, for example, the decision-making equipment 22 comprises respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 9A:
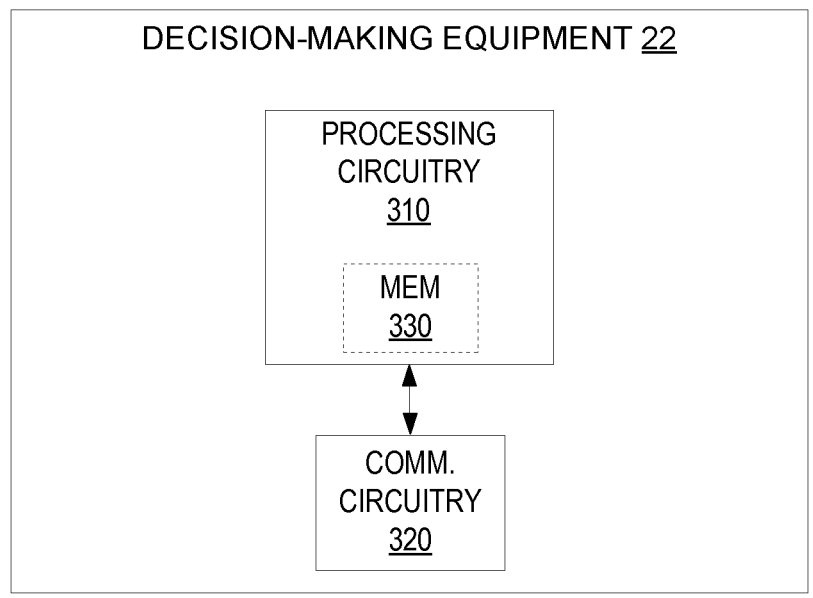
FIG. 9A is a block diagram of decision-making equipment according to some embodiments.

FIG. 9A for example illustrates the decision-making equipment 22 in accordance with one or more embodiments. As shown, the decision-making equipment 22 includes processing circuitry 310 and communication circuitry 320. The communication circuitry 320 (e.g., radio circuitry) is configured to transmit and/or receive information to and/or from one or more other nodes or equipment, e.g., via any communication technology. Such communication may occur via one or more antennas that are either internal or external to the decision-making equipment 22. The processing circuitry 310 is configured to perform processing described above (e.g., in FIG. 7), such as by executing instructions stored in memory 330. The processing circuitry 310 in this regard may implement certain functional means, units, or modules.

Figure 9B:
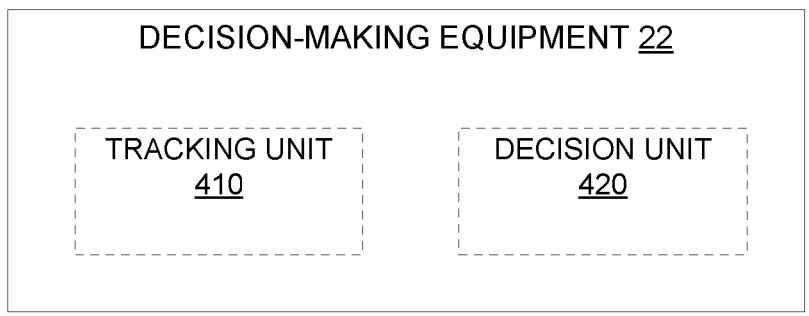
FIG. 9B is a block diagram of decision-making equipment according to other embodiments.

FIG. 9B illustrates a schematic block diagram of the decision-making equipment 22 according to still other embodiments. As shown, the decision-making equipment 22 implements various functional means, units, or modules, e.g., via the processing circuitry 310 in FIG. 9A and/or via software code. These functional means, units, or modules, e.g., for implementing the method 100 herein, include for instance a tracking unit 410 for tracking rewards 30-1, . . . 30-M earned for, and outcomes 28-1, . . . 28-M of, respective link change decisions 26-1, . . . 26-M as described above. Also included is a decision unit 420 for making a link change decision 26-(M+1) based on the tracked rewards and outcomes.

Note also that network equipment herein for supporting link change decision making may be implemented by any network node or equipment in the radio access network or the core network of the system 10. The network equipment may perform the methods herein and any other processing by implementing any functional means, modules, units, or circuitry. In one embodiment, for example, the network equipment comprises respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 10A:
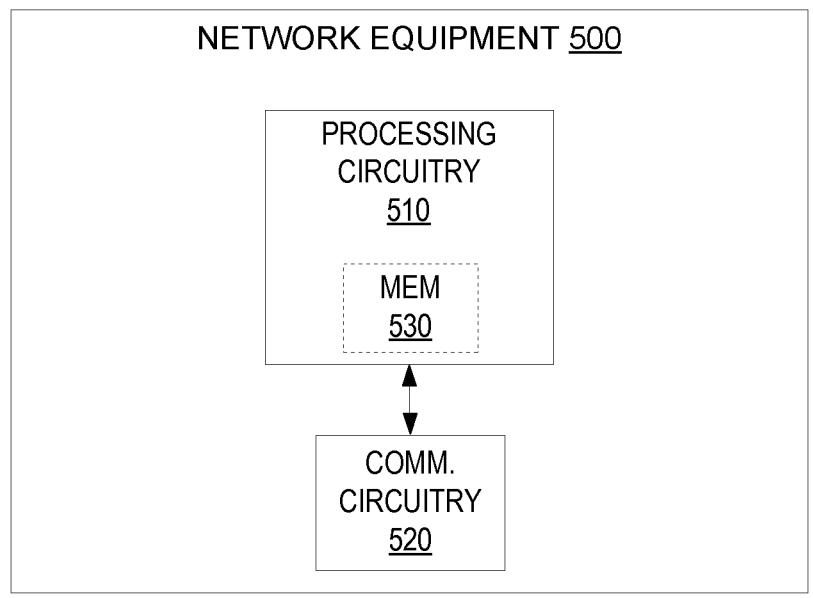
FIG. 10A is a block diagram of network equipment according to some embodiments.

FIG. 10A for example illustrates network equipment 500 for supporting link change decision-making using reinforcement learning in accordance with one or more embodiments. As shown, the network equipment 500 includes processing circuitry 510 and communication circuitry 520. The communication circuitry 520 (e.g., radio circuitry) is configured to transmit and/or receive information to and/or from one or more other nodes, e.g., via any communication technology. Such communication may occur via one or more antennas that are either internal or external to the network equipment 500. The processing circuitry 510 is configured to perform processing described above (e.g., in FIG. 8), such as by executing instructions stored in memory 530. The processing circuitry 510 in this regard may implement certain functional means, units, or modules.

Figure 10B:
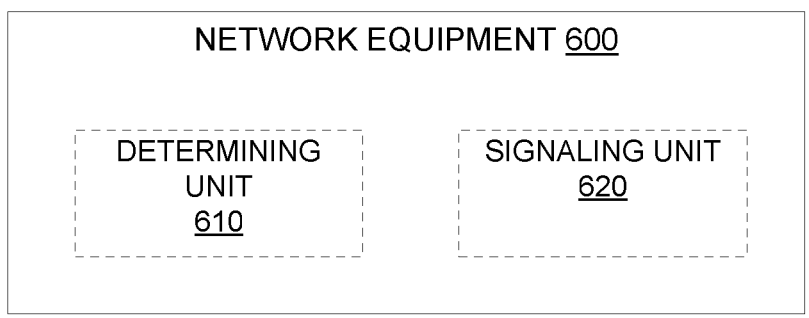
FIG. 10B is a block diagram of network equipment according to other embodiments.

FIG. 10B illustrates a schematic block diagram of network equipment 600 for supporting link change decision-making using reinforcement learning according to still other embodiments. As shown, the network equipment 600 implements various functional means, units, or modules, e.g., via the processing circuitry 510 in FIG. 10A and/or via software code. These functional means, units, or modules may include a determining unit 610 for determining rewards 30-1, . . . 30-M earned for, and outcomes 28-1, . . . 28-M of, respective link change decisions 26-1, . . . 26-M as described above. Also included may be a signaling unit 620 for signaling the determined rewards and outcomes to decision-making equipment 22 that made the respective link change decisions.

Those skilled in the art will also appreciate that embodiments herein further include corresponding computer programs.

A computer program comprises instructions which, when executed on at least one processor of decision-making equipment 22 or network equipment 500, 600, cause the at least one processor to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Embodiments further include a computer program product comprising program code portions for performing the steps of any of the embodiments herein when the computer program product is executed by a computing device. This computer program product may be stored on a computer readable recording medium.

Figure 11:
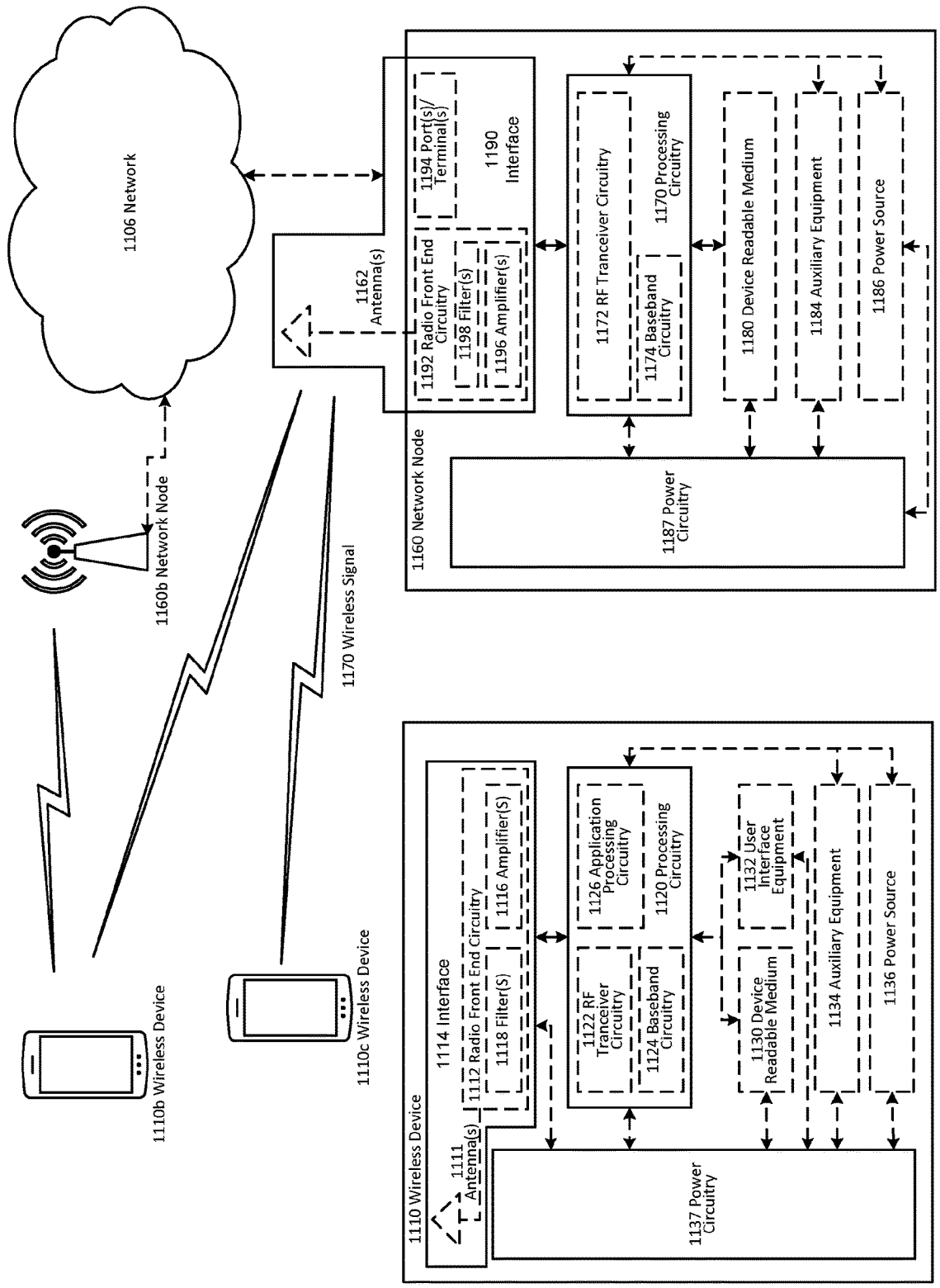
FIG. 11 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160b, and WDs 1110, 1110b, and 1110c. The decision-making equipment 22 may be or be included in any of network nodes 1160, 1160b, or any of WDs 1110, 1110b, or 1110c. Similarly, network equipment 500 or 600 may be or be included in any of network nodes 1160 or 1160b. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections. Network nodes shown may be examples of network equipment.

As used herein, network equipment refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network equipment include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. Network equipment may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network equipment include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, network equipment may be a virtual network node as described in more detail below. More generally, however, network equipment may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
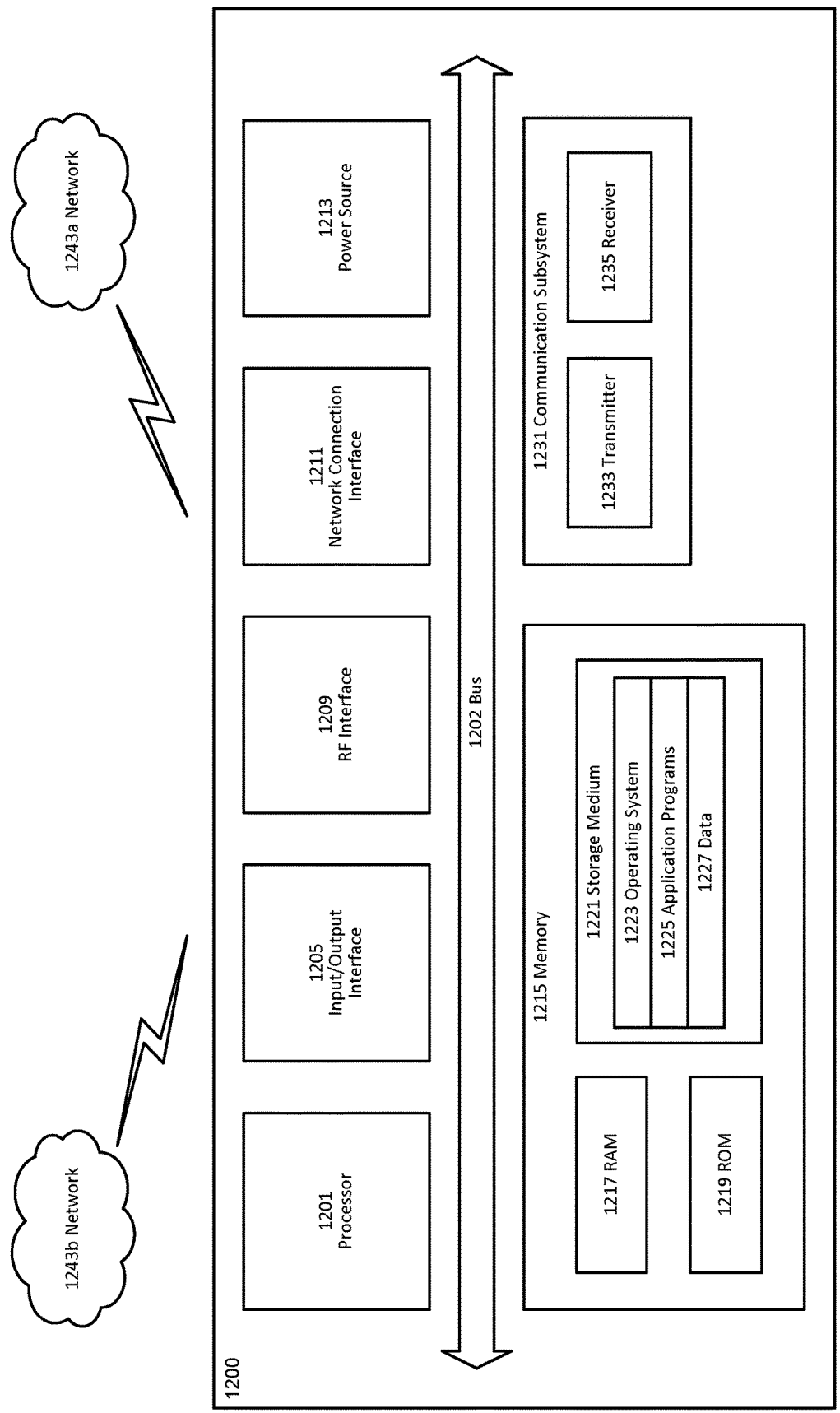
FIG. 12 is a block diagram of a user equipment according to some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 13:
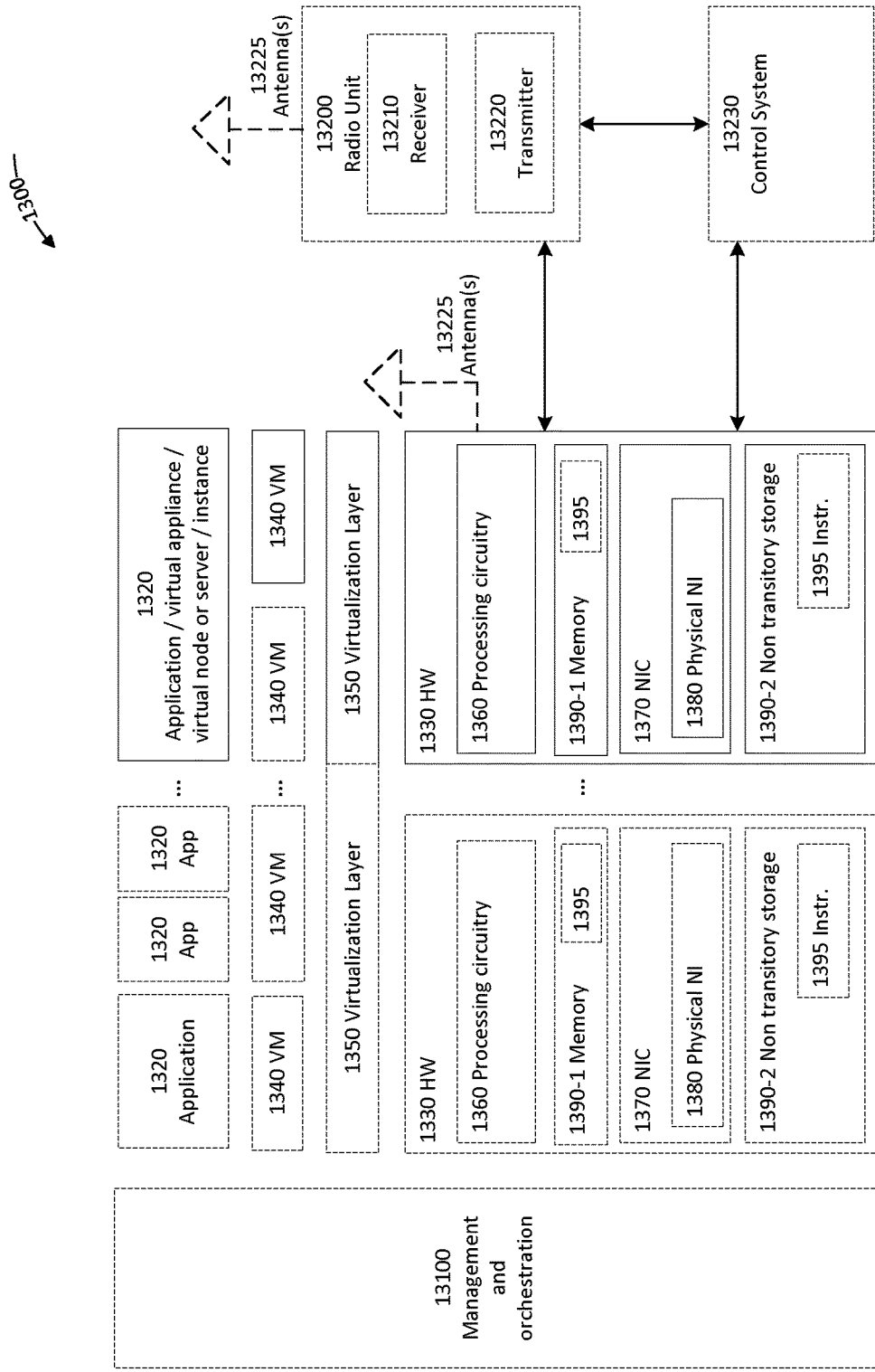
FIG. 13 is a block diagram of a virtualization environment according to some embodiments.

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Figure 14:
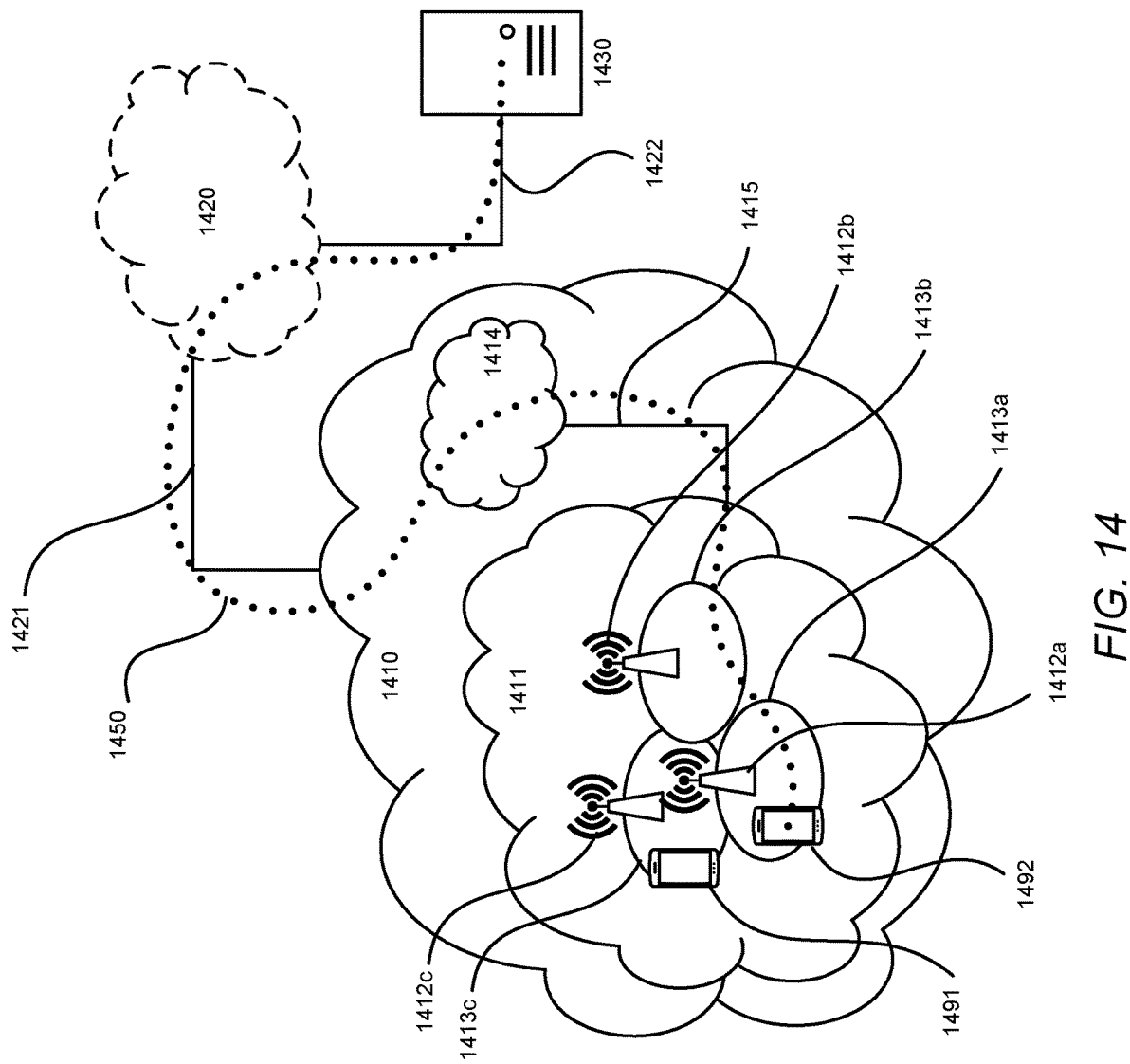
FIG. 14 is a block diagram of a communication network with a host computer according to some embodiments.

FIG. 14 illustrates a telecommunication network connected via an intermediate network to a host computer in accordance with some embodiments. In particular, with reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
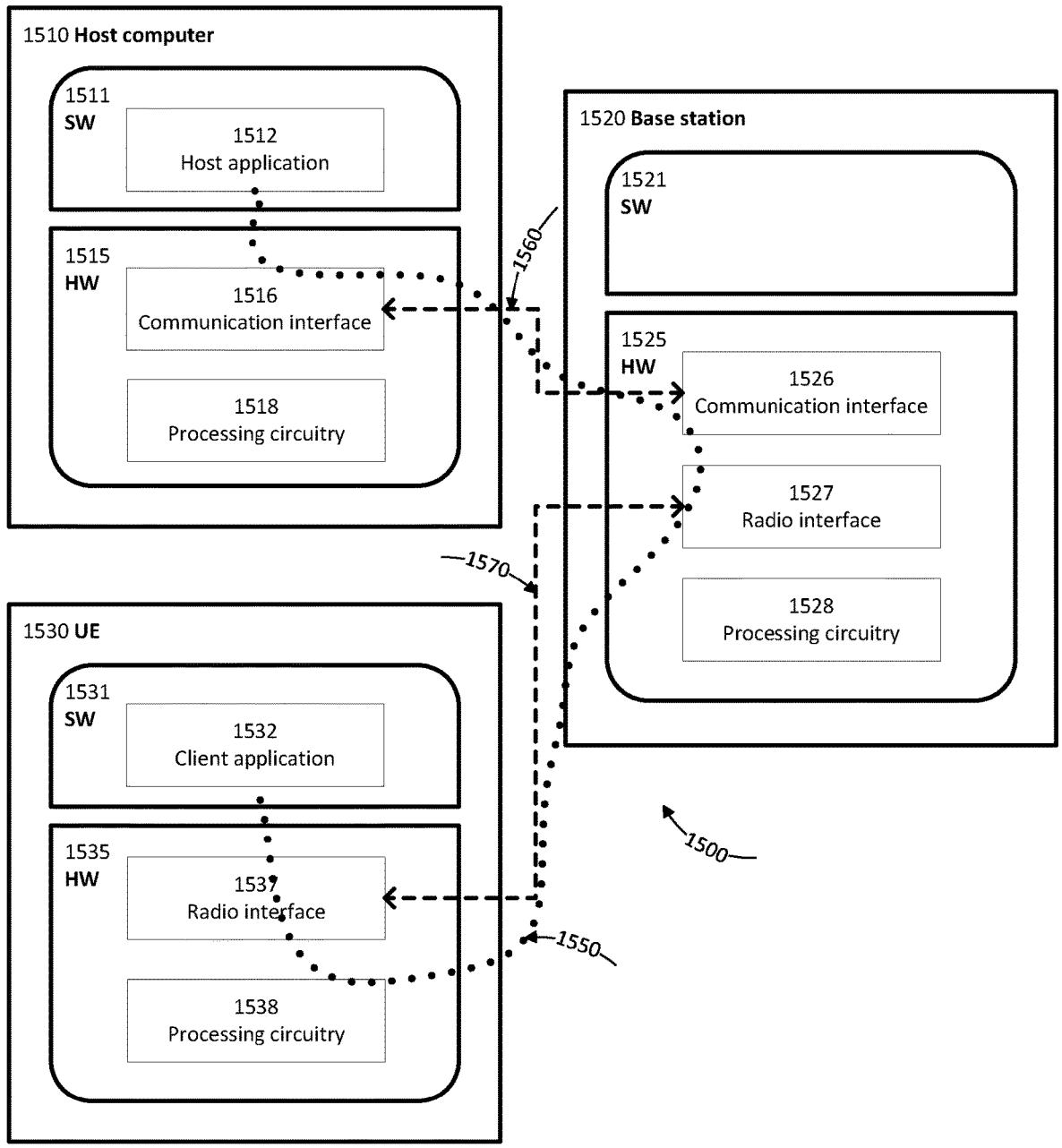
FIG. 15 is a block diagram of a host computer according to some embodiments.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412a, 1412b, 1412c and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the service performance of a wireless device and thereby provide benefits such as reduced user waiting time, better responsiveness, and relaxed constraints on file size.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 16:
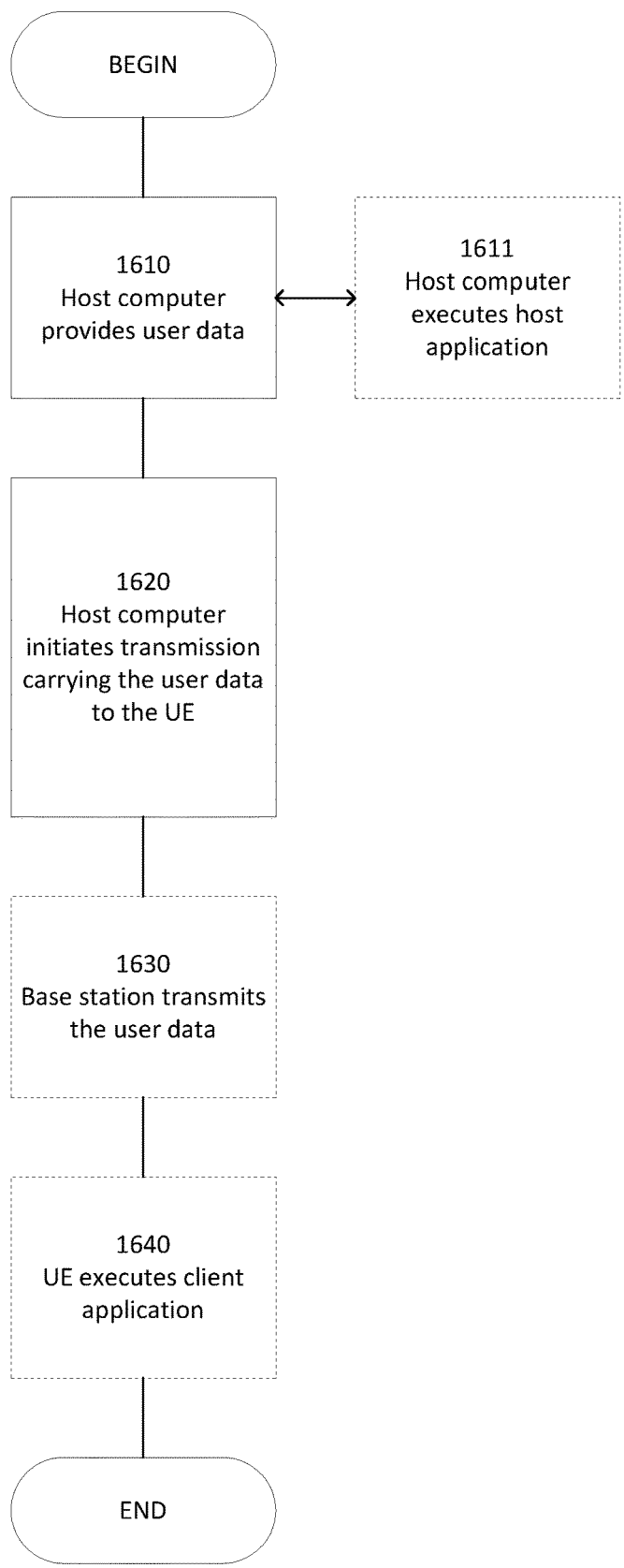
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 17:
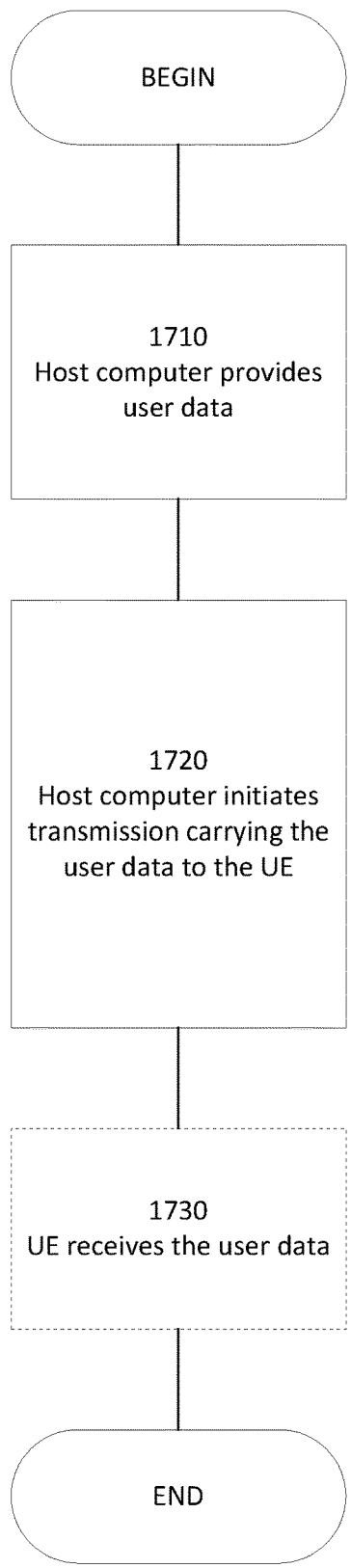
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
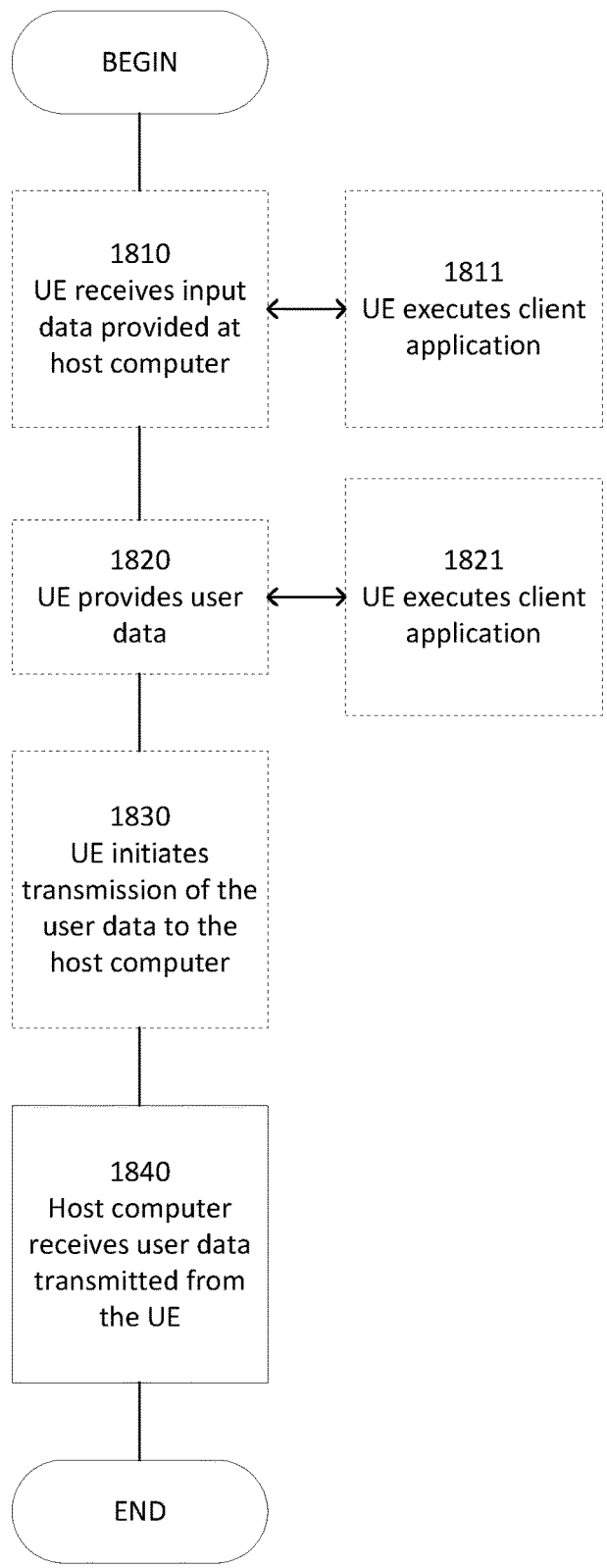
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
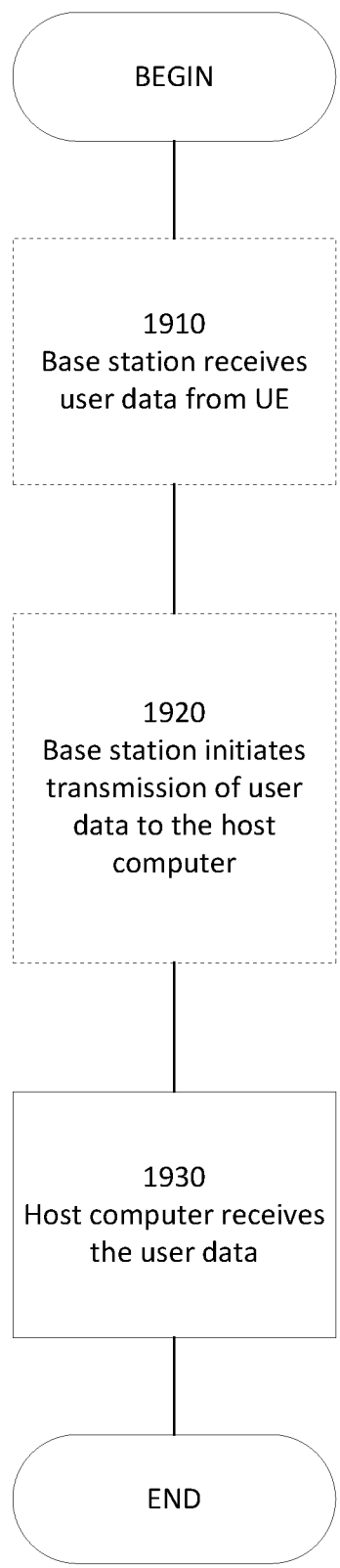
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method for link change decision-making using reinforcement learning, the method comprising:
tracking rewards earned for, and outcomes of, respective link change decisions, wherein possible outcomes of a link change decision to change a serving link of a wireless device to a target link include at least (i) a change of the serving link of the wireless device from the target link to another link and (ii) a network-initiated disconnect of the wireless device from the target link, wherein tracking rewards earned for, and outcomes of, respective link change decisions comprises, for each link change decision to change a serving link of a wireless device to a target link, tracking:
an outcome of the link change decision reflecting how the wireless device became detached or disconnected from the target link after the serving link of the wireless device was changed to the target link according to link change the decision; and
a reward earned for the link change decision characterizing an extent to which the link change decision was deemed successful up until the outcome of the link change decision occurred and/or as measured over a time period during which the wireless device was connected to, camped on, or attached via the target link; and
making a link change decision based on the tracked rewards and outcomes.

2. The method of claim 1, wherein making a link change decision based on the tracked rewards and outcomes comprises making a link change decision for a wireless device based selectively on the rewards and outcomes tracked for link change decisions previously made for that wireless device.

3. The method of claim 1, wherein making a link change decision comprises:
calculating, for each candidate target link that is a candidate for the link change decision to be made, a cumulative reward metric as a function of the rewards earned for past link change decisions that selected the candidate target link; and
making the link change decision as a function of the cumulative reward metrics calculated for the candidate target links.

4. The method of claim 3, wherein making the link change decision comprises:
selecting the candidate target link with the highest cumulative reward metric; or
selecting the candidate target link with the highest combined metric, wherein a combined metric is calculated for each candidate target link as a weighted combination of the cumulative reward metric and a measurement-based metric for the candidate target link, wherein the measurement-based metric for the candidate target link is a function of a measurement on the candidate target link.

5. The method of claim 3, wherein calculating the cumulative reward metric for each candidate target link comprises calculating the cumulative reward metric also as a function of discounts applied to rewards earned for past link change decisions that selected the candidate target link, wherein the discount applied to a reward earned for a past link change decision is a function of the outcome of that link change decision and/or is a function of how long ago the link change decision was made.

6. The method of claim 1, wherein either:
the link change decisions are handover decisions, wherein the method is performed by network equipment in a wireless communication network, and wherein the method further comprises transmitting control signaling indicating the link change decision made; or
the link change decisions are link reselection decisions, wherein the method is performed by a wireless device configured to make the link reselection decisions, and wherein the method further comprises performing a link change in accordance with the link change decision made.

7. The method of claim 6, wherein the link change decisions are handover decisions, wherein the method is performed by the network equipment, wherein the network equipment comprises radio network equipment configured to make link change decisions selectively for wireless devices served by the radio network equipment, and wherein the method further comprises receiving rewards for, and outcomes of, respective link change decisions that select a target link served by different network equipment in the wireless communication network.

8. The method of claim 1, wherein the reward earned for a link change decision to change a serving link of a wireless device to a target link:
characterizes an extent to which the decision was successful as measured over a time period during which the wireless device was connected to, camped on, or attached via the target link; or
is a function of a time spent metric, wherein the time spent metric is a function of time spent by the wireless device on the target link after the serving link of the wireless device was changed to the target link but before the outcome of the decision occurred, wherein the time spent metric has a maximum value if the time spent is above a threshold and has a value calculated from the time spent if the time spent is below the threshold.

9. The method of claim 1, wherein the reward earned for a link change decision to change a serving link of a wireless device to a target link is a function of two or more metrics, wherein the two or more metrics include two or more of:
a metric that is a function of whether and/or how many sessions of the wireless device were dropped on the target link after the serving link of the wireless device was changed to the target link;
a metric that is a function of a signal strength and/or quality measured by the wireless device on the target link after the serving link of the wireless device was changed to the target link;
a metric that is a function of a per-service quality of experience for the wireless device on the target link after the serving link of the wireless device was changed to the target link; and
a metric that is a function of time spent by the wireless device on the target link after the serving link of the wireless device was changed to the target link but before the outcome of the decision occurred.

10. The method of claim 1, wherein making a link change decision based on the tracked rewards and outcomes comprises making a link change decision to change a serving link of a wireless device to a target link with a goal of maximizing a reward that will be earned for the link change decision, as reinforced by rewards earned for past link change decisions.

11. The method of claim 1, wherein the reward earned for a link change decision to change a serving link of a wireless device to a target link characterizes an extent to which the decision was successful up until the outcome of the link change decision occurred.

12. Decision-making equipment configured for link change decision- making using reinforcement learning, the decision-making equipment comprising communication circuitry and processing circuity whereby the decision-making equipment is configured to:
track rewards earned for, and outcomes of, respective link change decisions, wherein possible outcomes of a link change decision to change a serving link of a wireless device to a target link include at least (i) a change of the serving link of the wireless device from the target link to another link and (ii) a network-initiated disconnect of the wireless device from the target link, wherein the decision-making equipment is configured to track rewards earned for, and outcomes of, respective link change decisions by, for each link change decision to change a serving link of a wireless device to a target link, tracking:
- an outcome of the link change decision reflecting how the wireless device became detached or disconnected from the target link after the serving link of the wireless device was changed to the target link according to link change the decision; and
- a reward earned for the link change decision characterizing an extent to which the link change decision was deemed successful up until the outcome of the link change decision occurred and/or as measured over a time period during which the wireless device was connected to, camped on, or attached via the target link; and
- make a link change decision based on the tracked rewards and outcomes.

13. The decision-making equipment of claim 12, wherein making a link change decision based on the tracked rewards and outcomes comprises making a link change decision for a wireless device based selectively on the rewards and outcomes tracked for link change decisions previously made for that wireless device.

14. The decision-making equipment of claim 12, the decision-making equipment comprising communication circuitry and processing circuitry whereby the decision-making equipment is configured to make the link change decision by:
- calculating, for each candidate target link that is a candidate for the link change decision to be made, a cumulative reward metric as a function of the rewards earned for past link change decisions that selected the candidate target link; and
- making the link change decision as a function of the cumulative reward metrics calculated for the candidate target links.

15. The decision-making equipment of claim 14, wherein making the link change decision comprises:
- selecting the candidate target link with the highest cumulative reward metric; or
- selecting the candidate target link with the highest combined metric, wherein a combined metric is calculated for each candidate target link as a weighted combination of the cumulative reward metric and a measurement-based metric for the candidate target link, wherein the measurement-based metric for the candidate target link is a function of a measurement on the candidate target link.

16. The decision-making equipment of claim 14, wherein calculating the cumulative reward metric for each candidate target link comprises calculating the cumulative reward metric also as a function of discounts applied to rewards earned for past link change decisions that selected the candidate target link, wherein the discount applied to a reward earned for a past link change decision is a function of the outcome of that link change decision and/or is a function of how long ago the link change decision was made.

17. The decision-making equipment of claim 12, wherein either:
- the link change decisions are handover decisions, wherein the decision-making equipment comprises network equipment in a wireless communication network, and wherein the decision-making equipment comprises communication circuitry and processing circuitry whereby the decision-making equipment is configured to transmit control signaling indicating the link change decision made; or
- the link change decisions are link reselection decisions, wherein the decision-making equipment comprises a wireless device configured to make the link reselection decisions, and wherein the decision-making equipment comprises communication circuitry and processing circuity whereby the decision-making equipment is configured to perform a link change in accordance with the link change decision made.

18. The decision-making equipment of claim 17, wherein the link change decisions are handover decisions, wherein the decision-making equipment comprises the network equipment, wherein the network equipment comprises radio network equipment configured to make link change decisions selectively for wireless devices served by the radio network equipment, and wherein the decision-making equipment comprises communication circuitry and processing circuitry whereby the decision-making equipment is configured to receive rewards for, and outcomes of, respective link change decisions that select a target link served by different network equipment in the wireless communication network.

19. The decision-making equipment of claim 12, wherein the reward earned for a link change decision to change a serving link of a wireless device to a target link:
- characterizes an extent to which the decision was successful up until the outcome of the link change decision occurred; or
- characterizes an extent to which the decision was successful as measured over a time period during which the wireless device was connected to, camped on, or attached via the target link; or
- is a function of a time spent metric, wherein the time spent metric is a function of time spent by the wireless device on the target link after the serving link of the wireless device was changed to the target link but before the outcome of the decision occurred, wherein the time spent metric has a maximum value if the time spent is above a threshold and has a value calculated from the time spent if the time spent is below the threshold.

20. The decision-making equipment of claim 12, wherein the reward earned for a link change decision to change a serving link of a wireless device to a target link is a function of two or more metrics, wherein the two or more metrics include two or more of:
- a metric that is a function of whether and/or how many sessions of the wireless device were dropped on the target link after the serving link of the wireless device was changed to the target link;
- a metric that is a function of a signal strength and/or quality measured by the wireless device on the target link after the serving link of the wireless device was changed to the target link;
- a metric that is a function of a per-service quality of experience for the wireless device on the target link after the serving link of the wireless device was changed to the target link; and
- a metric that is a function of time spent by the wireless device on the target link after the serving link of the wireless device was changed to the target link but before the outcome of the decision occurred.

21. The decision-making equipment of claim 12, wherein the decision-making equipment is configured to make a link change decision based on the tracked rewards and outcomes by making a link change decision to change a serving link of a wireless device to a target link with a goal of maximizing a reward that will be earned for the link change decision, as reinforced by rewards earned for past link change decisions.

22. The decision-making equipment of claim 12, wherein the reward earned for a link change decision to change a serving link of a wireless device to a target link characterizes an extent to which the decision was successful up until the outcome of the link change decision occurred.

23. A method for supporting link change decision-making using reinforcement learning, the method comprising:
   determining rewards earned for, and outcomes of, respective link change decisions, wherein possible outcomes of a link change decision to change a serving link of a wireless device to a target link include at least (i) a change of the serving link of the wireless device from the target link to another link and (ii) a network-initiated disconnect of the wireless device from the target link, wherein determining rewards earned for, and outcomes of, respective link change decisions comprises, for each link change decision to change a serving link of a wireless device to a target link, determining:
      an outcome of the link change decision reflecting how the wireless device became detached or disconnected from the target link after the serving link of the wireless device was changed to the target link according to link change the decision; and
      a reward earned for the link change decision characterizing an extent to which the link change decision was deemed successful up until the outcome of the link change decision occurred and/or as measured over a time period during which the wireless device was connected to, camped on, or attached via the target link; and
   signaling the determined rewards and outcomes to decision-making equipment that made the respective link change decisions.

24. Network equipment for supporting link change decision-making using reinforcement learning, the network equipment comprising communication circuitry and processing circuitry whereby the network equipment is configured to:
   determine rewards earned for, and outcomes of, respective link change decisions, wherein possible outcomes of a link change decision to change a serving link of a wireless device to a target link include at least (i) a change of the serving link of the wireless device from the target link to another link and (ii) a network-initiated disconnect of the wireless device from the target link, wherein the network equipment is configured to determine rewards earned for, and outcomes of, respective link change decisions by, for each link change decision to change a serving link of a wireless device to a target link, determining:
      an outcome of the link change decision reflecting how the wireless device became detached or disconnected from the target link after the serving link of the wireless device was changed to the target link according to link change the decision; and
      a reward earned for the link change decision characterizing an extent to which the link change decision was deemed successful up until the outcome of the link change decision occurred and/or as measured over a time period during which the wireless device was connected to, camped on, or attached via the target link; and
   signal the determined rewards and outcomes to decision-making equipment that made the respective link change decisions.

* * * * *